(12) United States Patent
Bosze et al.

(10) Patent No.: US 10,627,991 B2
(45) Date of Patent: Apr. 21, 2020

(54) DEVICE AND CONTROL METHODS THEREFOR

(71) Applicant: KING.COM LIMITED, St. Julians (MT)

(72) Inventors: Manuel Kurt Bosze, Berlin (DE); Kirill Muzykov, Berlin (DE)

(73) Assignee: KING.COM LTD., St. Julians (MT)

( * ) Notice: Subject to any disclaimer, the term of this patent is extended or adjusted under 35 U.S.C. 154(b) by 246 days.

(21) Appl. No.: 14/922,674

(22) Filed: Oct. 26, 2015

(65) Prior Publication Data

US 2017/0115831 A1   Apr. 27, 2017

(51) Int. Cl.
| | | |
|---|---|---|
| *G06F 3/048* | (2013.01) | |
| *G06F 3/0482* | (2013.01) | |
| *G06F 3/0488* | (2013.01) | |
| *G06F 3/01* | (2006.01) | |
| *A63F 13/525* | (2014.01) | |
| *A63F 13/2145* | (2014.01) | |
| *A63F 13/50* | (2014.01) | |
| *G06F 3/0484* | (2013.01) | |
| *A63F 13/426* | (2014.01) | |
| *A63F 13/822* | (2014.01) | |

(52) U.S. Cl.
CPC ........ *G06F 3/0482* (2013.01); *A63F 13/2145* (2014.09); *A63F 13/50* (2014.09); *A63F 13/525* (2014.09); *G06F 3/017* (2013.01); *G06F 3/04842* (2013.01); *G06F 3/04886* (2013.01); *A63F 13/426* (2014.09); *A63F 13/822* (2014.09)

(58) Field of Classification Search
CPC .... G06F 3/0482; G06F 3/017; G06F 3/04842; G06F 3/048; G06F 3/0237
See application file for complete search history.

(56) References Cited

U.S. PATENT DOCUMENTS

| | | | | |
|---|---|---|---|---|
| 6,636,244 | B1* | 10/2003 | Kelley | G06F 3/04842 |
| | | | | 715/781 |
| 7,530,030 | B2* | 5/2009 | Baudisch | G06F 3/0481 |
| | | | | 715/747 |
| 9,092,134 | B2* | 7/2015 | Figura | G06F 3/04886 |

(Continued)

FOREIGN PATENT DOCUMENTS

WO   2015/051047 A1   4/2015

OTHER PUBLICATIONS

International Search Report, dated Jan. 2, 2017, and Written Opinion issued in corresponding International Application No. PCT/EP2016/075705.

*Primary Examiner* — Mahelet Shiberou
(74) *Attorney, Agent, or Firm* — Saul Ewing Arnstein & Lehr LLP

(57) ABSTRACT

A method of controlling a user interface of a device responsive to user input by a user comprising: displaying on the user interface of the device a plurality of objects displayed in an arrangement, each object having one or more characteristics; providing an array of selection detection areas, and associating each of the selection detection areas with a respective object on the user interface so as to enable detection of selection of one or more of the objects by the user; following a selection of one of the plurality of objects by the user, predicting a subsequent object to be selected by the user in dependence on one or more selection criteria; and enlarging a selection detection area associated with the subsequent object.

22 Claims, 22 Drawing Sheets

(56) References Cited

U.S. PATENT DOCUMENTS

| | | | | |
|---|---|---|---|---|
| 9,411,510 B2* | 8/2016 | Greenzeiger | | G06F 3/04886 |
| 2006/0232551 A1* | 10/2006 | Matta | | G06F 1/1626 |
| | | | | 345/156 |
| 2007/0229476 A1* | 10/2007 | Huh | | G06F 3/04886 |
| | | | | 345/173 |
| 2008/0064483 A1* | 3/2008 | Sakuma | | G07F 17/32 |
| | | | | 463/20 |
| 2009/0113330 A1* | 4/2009 | Garrison | | G06F 3/0486 |
| | | | | 715/769 |
| 2009/0262089 A1* | 10/2009 | Wang | | G06F 3/04883 |
| | | | | 345/173 |
| 2011/0138324 A1* | 6/2011 | Sweeney | | G06F 3/0481 |
| | | | | 715/800 |
| 2011/0210850 A1* | 9/2011 | Tran | | G06F 3/04883 |
| | | | | 340/540 |
| 2011/0264442 A1* | 10/2011 | Huang | | G06F 3/04886 |
| | | | | 704/9 |
| 2012/0019472 A1 | 1/2012 | Tomita et al. | | |
| 2013/0097564 A1 | 4/2013 | Morikawa et al. | | |
| 2013/0311956 A1* | 11/2013 | Li | | G06F 3/017 |
| | | | | 715/863 |
| 2014/0115522 A1* | 4/2014 | Kataoka | | G06F 3/017 |
| | | | | 715/773 |
| 2014/0235306 A1* | 8/2014 | Walls | | A63F 13/10 |
| | | | | 463/9 |
| 2014/0342823 A1* | 11/2014 | Kapulkin | | A63F 13/355 |
| | | | | 463/31 |
| 2015/0012875 A1* | 1/2015 | Miyazaki | | G06F 3/04886 |
| | | | | 715/773 |
| 2015/0026637 A1* | 1/2015 | Ross | | G06F 3/0481 |
| | | | | 715/810 |
| 2015/0258444 A1* | 9/2015 | Norden | | A63F 13/56 |
| | | | | 463/31 |
| 2015/0343311 A1* | 12/2015 | Cirlig | | A63F 13/537 |
| | | | | 463/31 |
| 2015/0355805 A1* | 12/2015 | Chandler | | G06F 3/0482 |
| | | | | 715/784 |
| 2016/0048286 A1* | 2/2016 | Picon | | G06F 3/0488 |
| | | | | 463/33 |

\* cited by examiner

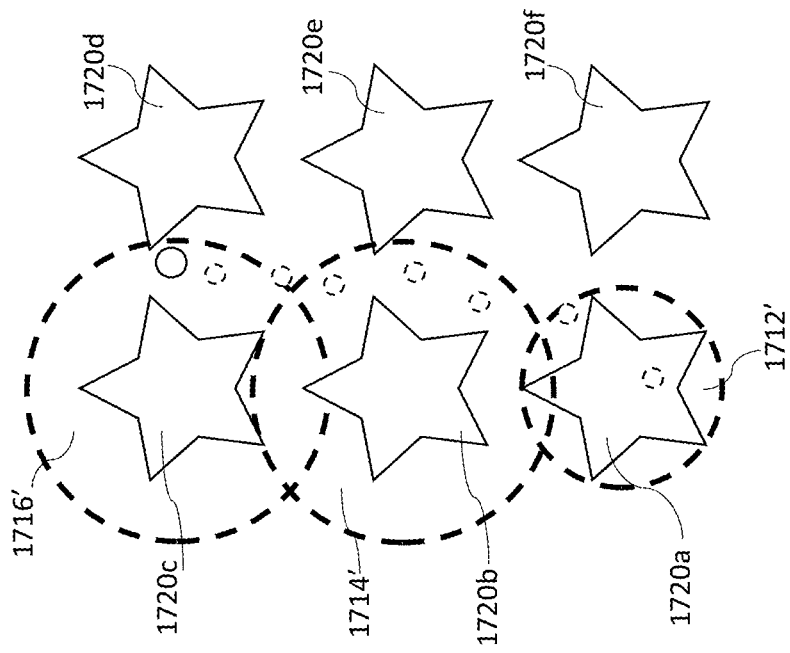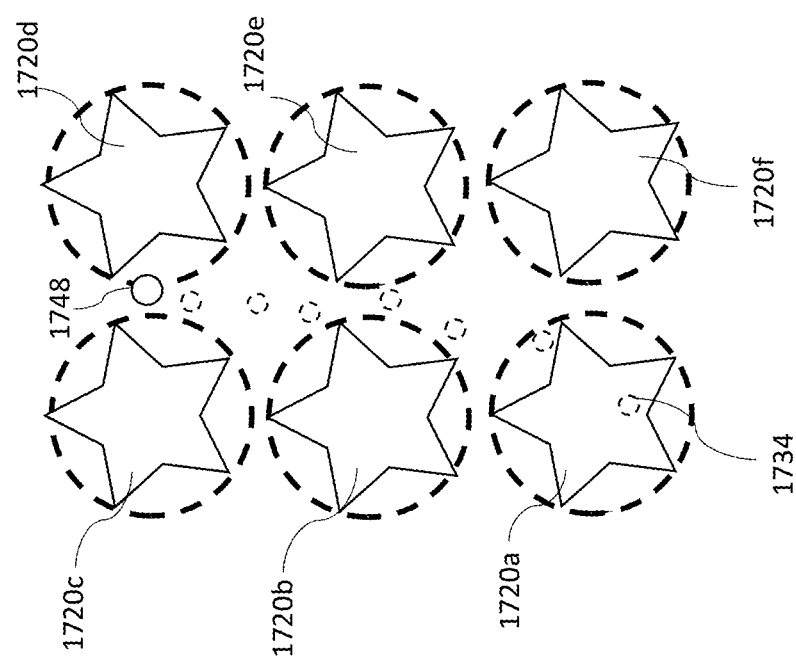

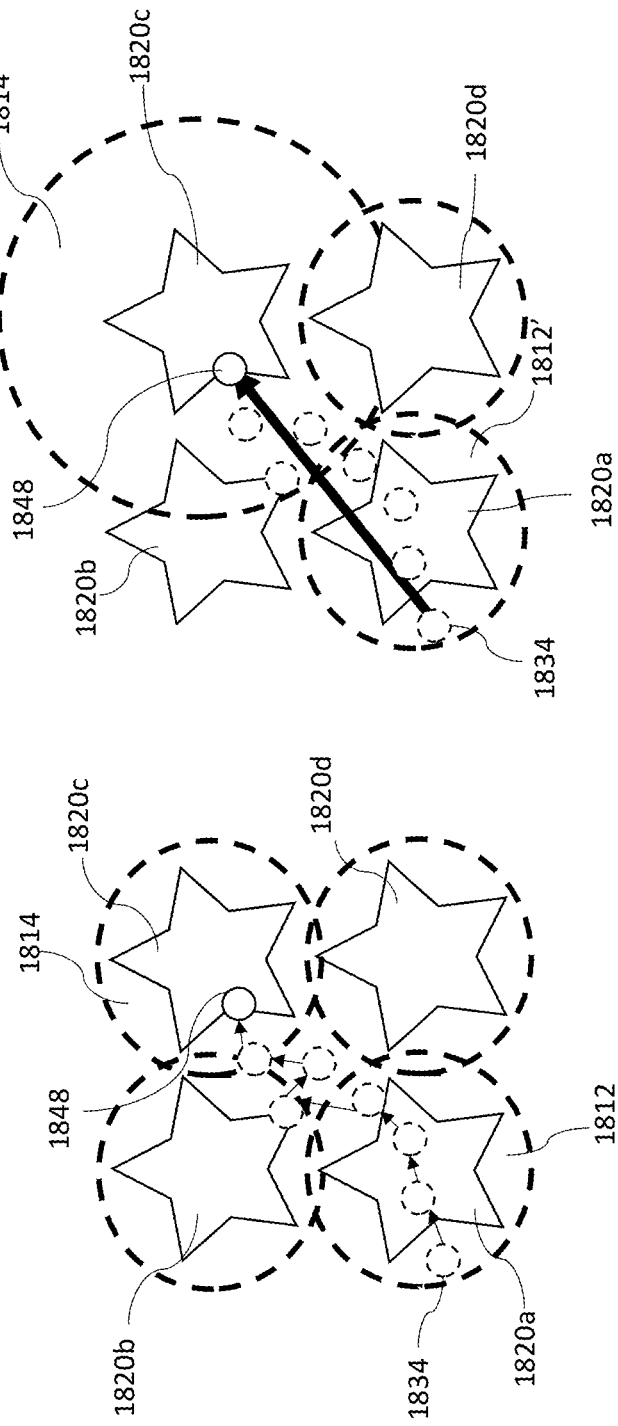

DEVICE AND CONTROL METHODS THEREFOR

FIELD OF THE INVENTION

Some embodiments may relate to controlling a user interface responsive to user engagement with displayed objects on the interface of a computer device.

Some embodiments may relate to computer devices having a user interface for engaging users or players in a computer game executable in an online environment.

BACKGROUND OF THE INVENTION

There are many technical challenges and technical considerations facing the designer of computer devices having a user interface, such as designing a controllable user interface in the context of available computer devices and resources, which may be limited.

In the context of a game for example, another technical challenge can involve enabling a game to be fun, accessible and compelling even when there are limited display resources available, such as when a game is being played on a smartphone, tablet or other small or portable computer. Another significant challenge is that of user engagement. Engagement involves designing gameplay to be engaging and rewarding to players. This typically requires games to be easily understood at their simplest or introductory levels, providing rewarding gameplay with simple to complex game mechanics, and becoming progressively more challenging so that players are not bored, but remain engaged and develop rewarding skills.

Effective engagement may also require various forms of feedback based on the game mechanics so that successful utilisation by the user reinforces the user's sense of success and accomplishment.

There exist many types of computer device where the display is controlled by an input. The input may be a cursor or pointer that is controlled by a human interface device such as a mouse, joystick, keyboard etc. Increasingly, the display may comprise a touchscreen which can be controlled by a user's touch. That is, activation of functions or objects are responsive to user input made by way of the user touching the screen.

Touch screens may be provided on smaller devices such as smart phones. Interaction with objects displayed on such touch screens can be difficult in that the size of a user's finger is relatively large with respect to the area of the screen where for example an object is displayed. This may lead to a lack of precision when for example playing a computer implemented game on a smart phone.

There are therefore many technical challenges when designing computer implemented games, particularly in providing a challenge to a user or player that is engaging and rewarding so as to provoke repeat play. This may, but not exclusively apply to "casual games".

This patent specification describes not only various ideas and functions, but also their creative expression. A portion of the disclosure of this patent document therefore contains material to which a claim for copyright is made and notice is hereby given: Copyright King.com Limited 2015 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In a first aspect there is provided a method of controlling a user interface of a device responsive to user input by a user comprising: displaying on the user interface of the device a plurality of objects displayed in an arrangement, each object having one or more characteristics; providing an array of selection detection areas, and associating each of the selection detection areas with a respective object on the user interface so as to enable detection of selection of one or more of the objects by the user; following a selection of one of the plurality of objects by the user, predicting a subsequent object to be selected by the user in dependence on one or more selection criteria; and enlarging a selection detection area associated with the subsequent object.

According to some embodiments, the one of the plurality of objects is positioned at a first position in the arrangement and the subsequent object is positioned at a second position in the arrangement, the first position spaced from the second position.

According to some embodiments, predicting the subsequent object comprises determining a direction of user input on the user interface.

According to some embodiments, the determining a direction of user input comprises determining an average direction of the user input.

According to some embodiments, the determining a direction of user input comprises sampling a plurality of points of contact of the user input on the user interface.

According to some embodiments, if there is more than one candidate object to be the subsequent object, then the method comprises selecting an object whose selection comprises the least deviation from the determined direction of user input to be the subsequent object.

According to some embodiments, the method comprises only enlarging one selection detection area of the array of selection detection areas at any one time.

According to some embodiments, the method comprises only enlarging a selection detection area if it is associated with an object which shares at least one characteristic with the one of the plurality of objects, in accordance with the selection criteria.

According to some embodiments, the array of selection detection areas is invisible to the user.

According to some embodiments, the user input comprises sliding of a user's finger or stylus over the arrangement on the user interface.

According to some embodiments the plurality of objects comprise a plurality of game objects on a game board.

According to some embodiments the selection criteria comprises game rules associated with a game.

According to some embodiments, the game rules comprise linking objects having one or more characteristics in common.

In a second aspect there is provided a non-transitory computer readable medium comprising computer executable instructions, which when run by at least one processor are configured to control a user interface of a device responsive to user input by a user by: displaying on the user interface of the device a plurality of objects displayed in an arrangement, each object having one or more characteristics; providing an array of selection detection areas, and associating each of the selection detection areas with a respective object on the user interface so as to enable detection of selection of one or more of the objects by the user; following a selection of one of the plurality of objects by the user, predicting a subsequent object to be selected by the user in dependence on one or more selection criteria; and enlarging a selection detection area associated with the subsequent object.

In a third aspect there is provided an apparatus comprising: at least one memory and at least one processor, the at least one memory and the at least one processor configured to cause the apparatus to: display on a user interface of the apparatus a plurality of objects displayed in an arrangement, each object having one or more characteristics; provide an array of selection detection areas, and associate each of the selection detection areas with a respective object on the user interface so as to enable detection of selection of one or more of the objects by the user; following a selection of one of the plurality of objects by the user, predict a subsequent object to be selected by the user in dependence on one or more selection criteria; and enlarge a selection detection area associated with the subsequent object.

According to some embodiments, the one of the plurality of objects is positioned at a first position in the arrangement and the subsequent object is positioned at a second position in the arrangement, the first position spaced from the second position.

According to some embodiments, the apparatus is configured to determine a direction of user input on the user interface when predicting the subsequent object.

According to some embodiments, the apparatus is configured to determine an average direction of the user input when determining a direction of user input.

According to some embodiments, the apparatus is configured to sample a plurality of points of contact of the user input on the user interface when determining a direction of user input.

According to some embodiments, if there is more than one candidate object to be the subsequent object, then the apparatus is configured to select an object whose selection comprises the least deviation from the determined direction of user input to be the subsequent object.

According to some embodiments, the apparatus is configured to only enlarge one selection detection area of the array of selection detection areas at any one time.

According to some embodiments, the apparatus is configured to only enlarge a selection detection area if it is associated with an object which shares at least one characteristic with the one of the plurality of objects, in accordance with the selection criteria.

According to some embodiments, the array of selection detection areas is invisible to the user.

According to some embodiments, the user input comprises sliding of a user's finger or stylus over the arrangement on the user interface.

According to some embodiments, the plurality of objects comprises a plurality of game objects on a game board.

According to some embodiments, the selection criteria comprises game rules associated with a game.

According to some embodiments, the game rules comprise linking objects having one or more characteristics in common.

According to a fourth aspect there is provided a computer implemented method comprising: displaying game elements in a game board; determining a first touch point and a subsequent second touch point are respectively associated with a first game element and a second game element which are not adjacent on the displayed game board; determining one or more further game elements of the game board between the first and second game elements; and determining if the first game element, the second game element and the one or more further game elements satisfy a game rule.

The method may comprise using a line drawing algorithm to determine the one or more further game elements.

The method may comprise mapping the first and second touch points to x, y grid coordinates, the game board being represented by the grid and each integer x, y coordinates being associated with a respective game element.

The method may comprise determining a distance between the first and second touch points to determine if the first and second game elements are not adjacent. The method may comprise comparing the determined distance to a threshold.

The method may comprise determining that a move comprising the first, second and further game elements is valid if the first game element, the second game element and the one or more further game elements satisfy the game rule.

The method may comprise determining if a third game element is selected by a user and determining that a move comprising the first, second and one or more further game elements in addition to the third game element is valid if the first game element, the second game element, the one or more further game elements and the third game element satisfy the game rule.

The method may comprise determining a sample rate for sampling touch points and if the sampling rate is below a threshold carrying out one or more of the methods of embodiments.

BRIEF DESCRIPTION OF FIGURES

To understand some embodiments, reference will now be made by way of example only to the accompanying drawings, in which:

FIG. 18a shows an example of a portion of a game board when a prediction algorithm as described in the present application is not implemented;

FIG. 18b shows the game board of FIG. 18a when the prediction algorithm is implemented;

FIG. 19a shows an example of a portion of a game board when a prediction algorithm as described in the present application is not implemented;

FIG. 19b shows the game board of FIG. 19a when the prediction algorithm is implemented;

DETAILED DESCRIPTION OF THE INVENTION

The techniques described herein can be implemented in for instance a computer implemented game which involves switching and clicking, or touch and move input to match and thereby eliminate or remove objects.

The terms user and player are used interchangeably throughout this document and no specific meaning is intended using one or the other unless the context suggests otherwise. A person skilled in the art will realise that the different approaches to implementing the game are not exhaustive, what is described herein are certain preferred embodiments. It is possible to implement the invention in a number of variations without departing from its spirit or scope.

Figure 1:
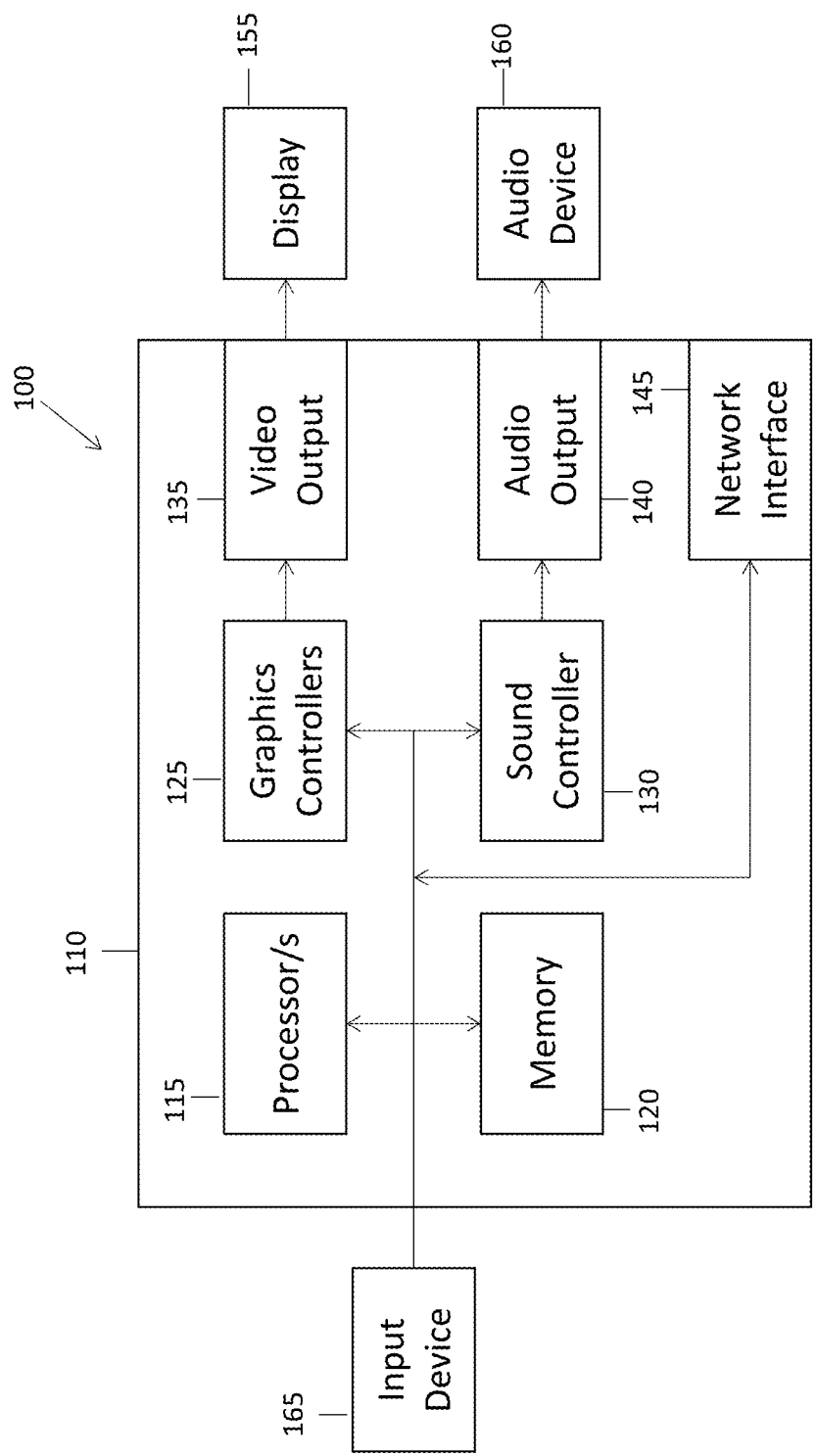
FIG. 1 shows an example device in which some embodiments may be provided.

Although some embodiments are described with respect to selection of game objects in a game, it will be understood that the invention is not limited as such. That is the invention may equally apply to selection of any kind of objects on a user interface A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that either or both of the graphics controller 125 and sound controller 130 may be provided by the one or more processors 115.

The graphics controller 125 is configured to provide a video output 135. The sound controller 130 is configured to provide an audio output 140. The controller 110 has an interface 145. The interface 145 may enable the device to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
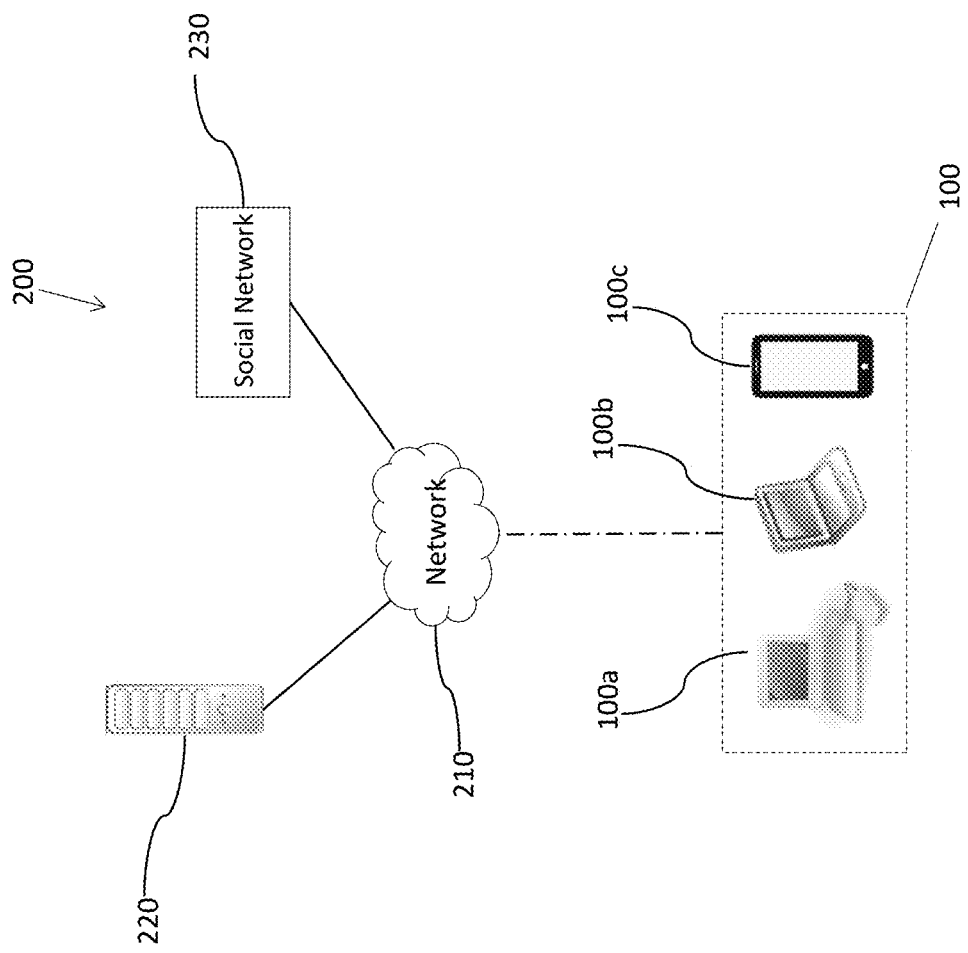
FIG. 2 shows an example system in which some embodiments may be provided.

FIG. 2 schematically shows a system 200 in some embodiments. The system 200 comprises a server 220 which may store databases of game player's details, profiles, statistics, etc. In practice, one or more databases may be provided. Where more than one server is provided, the database(s) may be provided in one database or across two or more servers. The server may also have a games data function. This may comprise one or more units of memory to store the computer game program and user behaviour data, and a processor to run the games program and process the user behaviour data.

The server 220 may communicate via for instance the internet 210 to one or more user devices 100, shown in the Figure by way of example as user devices 100a, 100b and 100c, and may further provide connections to a social network 230 such as facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

In some embodiments, the game may be implemented as a computer program that is stored in a memory of the system, for example the server 220, and which runs on a processor of the game server. Data streams or updates are supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet.

Figure 3:
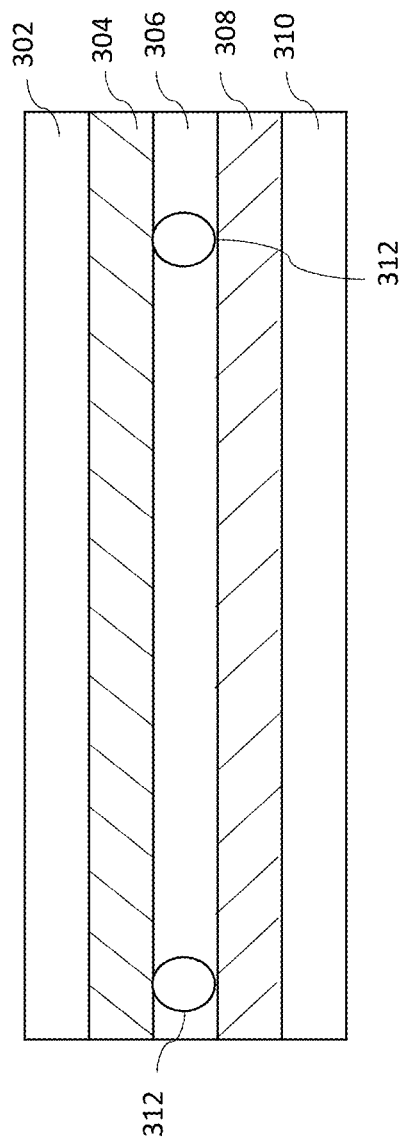
FIG. 3 shows a cross section of part of a touch screen display.

Reference is made to FIG. 3 which schematically shows a touch screen. The touch screen may incorporate any suitable touch screen technology. One example of a touch screen technology is the so-called resistive touch screen technology. Such a touch screen may be incorporated, for example, in a device 100 as shown in FIGS. 1 and 2.

A front layer or surface 302 of the touch screen is typically made of a scratch-resistant, flexible plastic or similar. A thin film or coating 304 of conductive material is provided on the underside of the front surface. The film of conductive material can be of any suitable material and may for example be Indium Tin Oxide. A gap 306 is provided. This gap may be created by suitable spacers 312. The gap may be an air gap. A second layer of material is provided. That layer may be of glass or hard plastic. The second layer 310 is also provided with a thin film or coating 308 of conductive material on the side of the second layer facing the spacing. The coating may be of any suitable material and may also be Indium Tin Oxide. Thus, the two layers 302 and 310 are kept apart by the spacers 312 which may be arranged at regular intervals. The thin conductive films or coatings are arranged to provide electrical resistance. The arrangement is such that the electrical charge runs in one direction on the one conductive coating or film and in a perpendicular direction on the other conductive coating or film.

With a resistive touch screen, when the screen is touched, the plastic deforms so that the two conductive films meet. By measuring the resistance of the two conductive films or coatings, the touch position can be accurately determined.

It should be appreciated that this is one example of a touch screen. Another technology often used for touch screens is capacitive technology. The structure of the touchscreen is similar to that described in relation to FIG. 3. However, the first layer may typically be glass, and thus not flexible. The conductive coatings may be a uniform layer, a grid or parallel stripes running at right angles to each other on the two layers. A capacitive arrangement is formed by the two conductive coatings separated by the insulating material (air). When the finger comes close to a capacitor, it changes the local electrostatic field. The touchscreen effectively is made up of a large number of tiny capacitors. The system is arranged to monitor each of these tiny capacitors to determine where the finger touches the screen. Capacitive touch screens have the advantage that it is possible to determine several discrete touch points at the same time.

It should be appreciated that embodiments may be used with any suitable touch screen technology. It will also be understood that a user may interact directly with a touch screen (e.g. with their finger), or via an implement such as a stylus. Any reference to a user touching or contacting the touch screen will therefore be understood to cover a user controlling a touch screen either by direct touch or with a suitable implement.

Embodiments may be particularly applicable for games which are to be played on devices which have a relatively small screen, such as smart phones and some smaller tablets. In such scenarios, a technical problem exists that the user has a problem in contacting a precise area on the small screen as the user's finger is relatively large relative to the screen. The contact location may control the selection of one more actions in a game. Subsequent interactions by the user are likely to be at a different location on the screen which may lead the user to inadvertently select the wrong option. If a user has to make a series of taps, the user contact with the screen may drift over time. With a small screen, this could lead to a different option being selected when the user is attempting to select the same option repeatedly.

Figure 4:
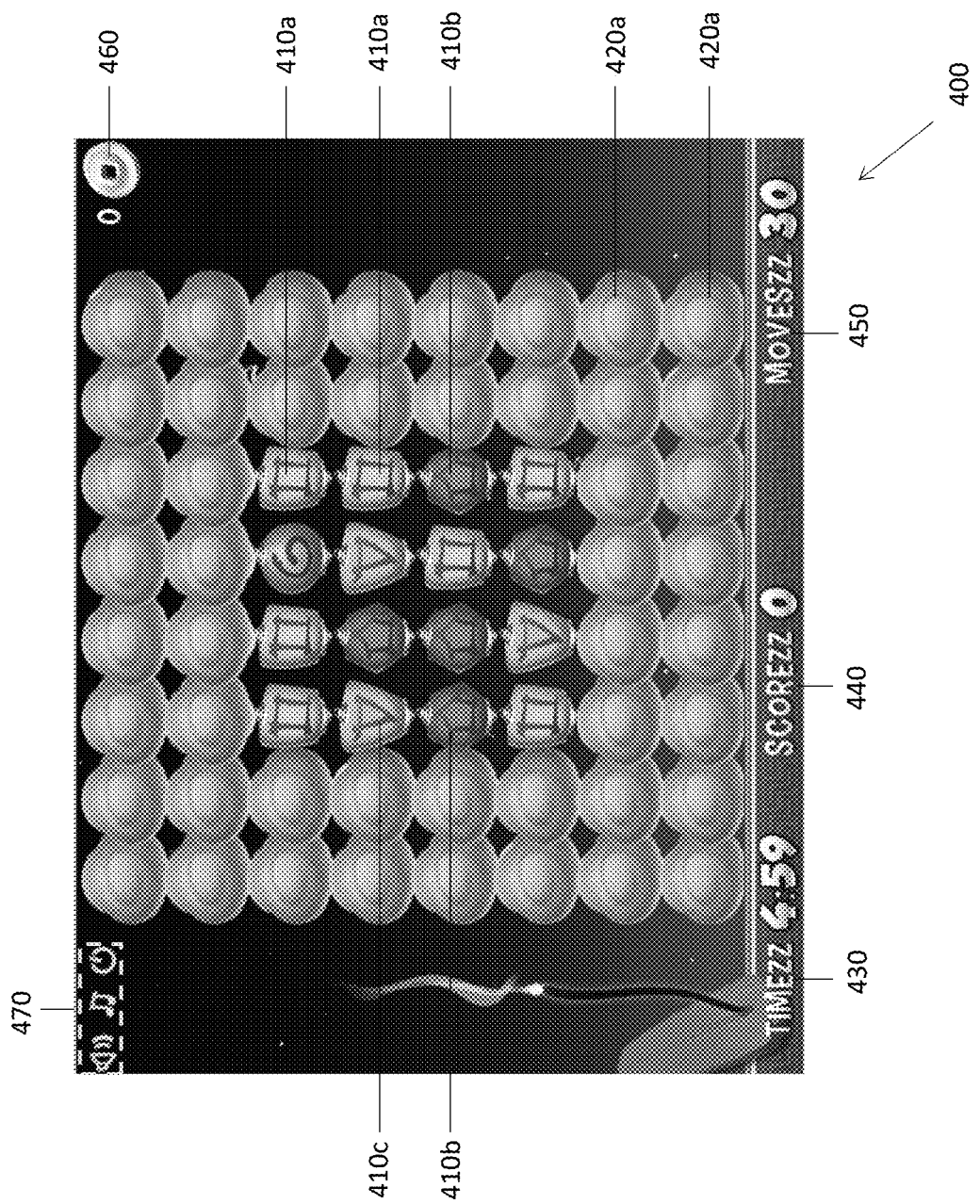
FIGS. 4 to 7 show an example game board comprised in a "linker" game.

An embodiment will now be described. FIG. 4 illustrates an example displayed game area or game board 400. The game has a game board 400 upon which are disposed first game objects 410*a*, 410*b*, 410*c* which may have varying characteristics. Also disposed on the game board 400 are a number of second game objects 420*a*. The characteristics shared by the first and second game objects may be one or more of colour, shape, and/or different types of objects. In this embodiment, the first game objects are differently coloured and shaped lanterns as shown in FIG. 4. Information of the game objects and/or information of characteristics associated with the game objects may be stored in a memory of a device upon which the game is being played, and/or in a game server communicating with the device. There may also be provided a player selection indicator (not shown in the Figure) which may be a representation of a pointer or hand in some embodiments, and may or may not be displayed to a user in some embodiments utilizing intuitive touchscreen or gesture recognition hardware. Of importance is that a selection mechanism is available for selecting a plurality of game objects, for example "clicking" and/or "switching", or for example a "touch and/or move" or slide mechanism for repositioning displayed first game objects 410*a*, 410*b*, 410*c*. The exact mechanism may be according to the computing or user device resources provided as described in FIGS. 1 and 2.

The game board 400 of FIG. 4 also shows, in this embodiment, an area comprising game information in the form of time elapsed 440, current score 440 and the number of remaining moves 450 available to the user. In addition basic user device controls 470 may be displayed as shown, and special or valuable objects 460 may be counted and displayed, depending on the rules of the computer implemented game.

First game objects 410*a*, 410*b*, 410*c*, 410*d* may be removed from the game board 400 by selecting neighbouring game objects 410*b* that share at least one same characteristic (e.g. colour, and/or type of object graphically represented) of the one or more characteristics. New first game objects may then be generated and displayed in the positions on the game board 400 vacated by those game objects 410*b* that have been removed or eliminated by the selections. The game objects 410*a*, 410*d* replacing those eliminated or removed game objects, may be displayed on the game board 400 and may subsequently cascade position by position in a vertical direction with respect to the game board to occupy those positions made available by the elimination of the first or second game objects.

Figure 5:
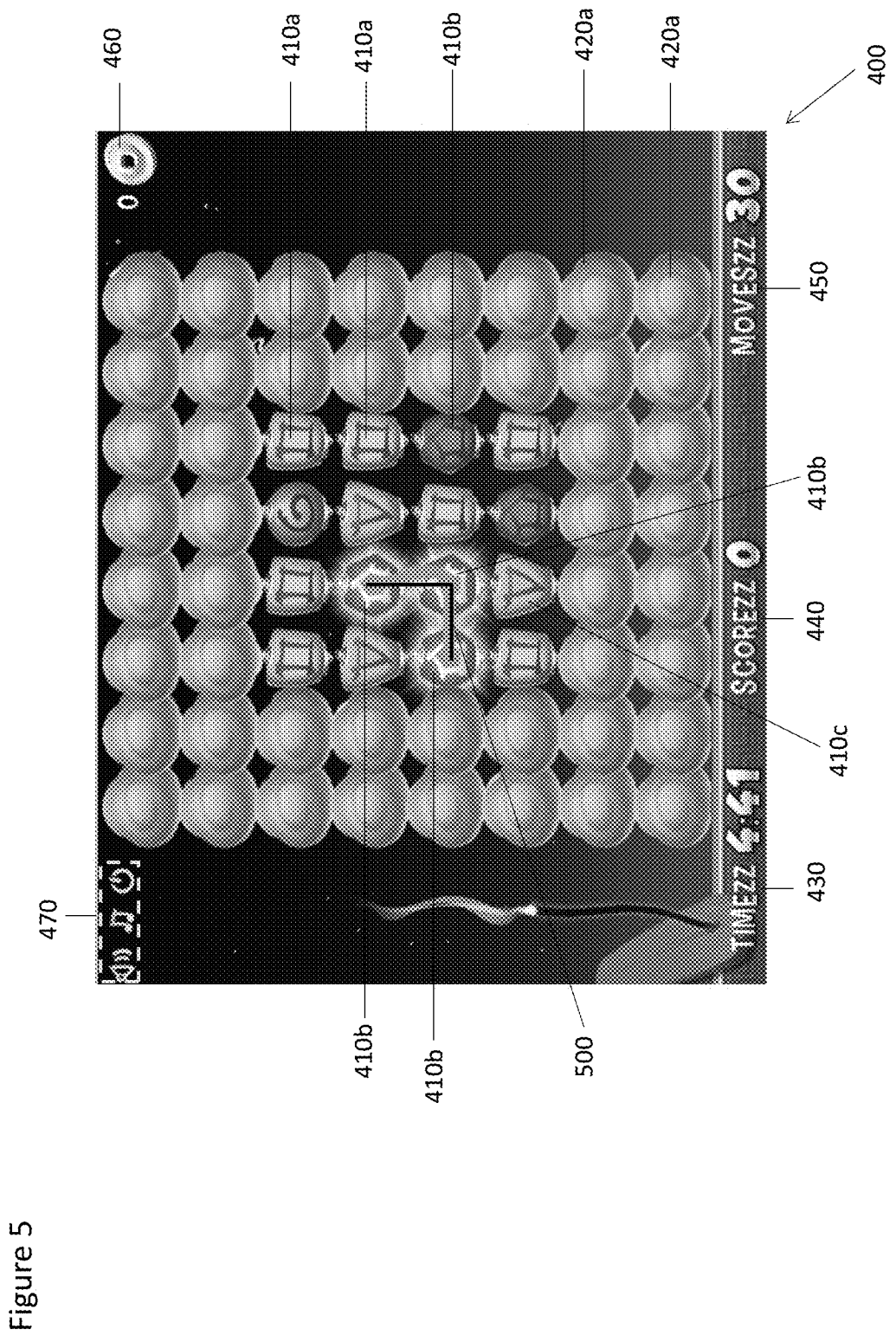

FIG. 5 illustrates such a mechanic in more detail. FIG. 5 shows a user selection of three neighbouring first game objects 410*b* sharing at least one same characteristic to remove or eliminate the three game objects 410*b* from the game board 400. The shared one or more characteristics of the three game objects 410*b* may in some embodiments be the colour of the first game objects 410*b* selected from for example a palette of four or more colour characteristics. In an embodiment, the four or more colours are for example red, green, blue and yellow.

The game board 400 illustrates the touch or select input track 600 input by the user to highlight and select the group of three first game objects 410*b*.

Figure 6:
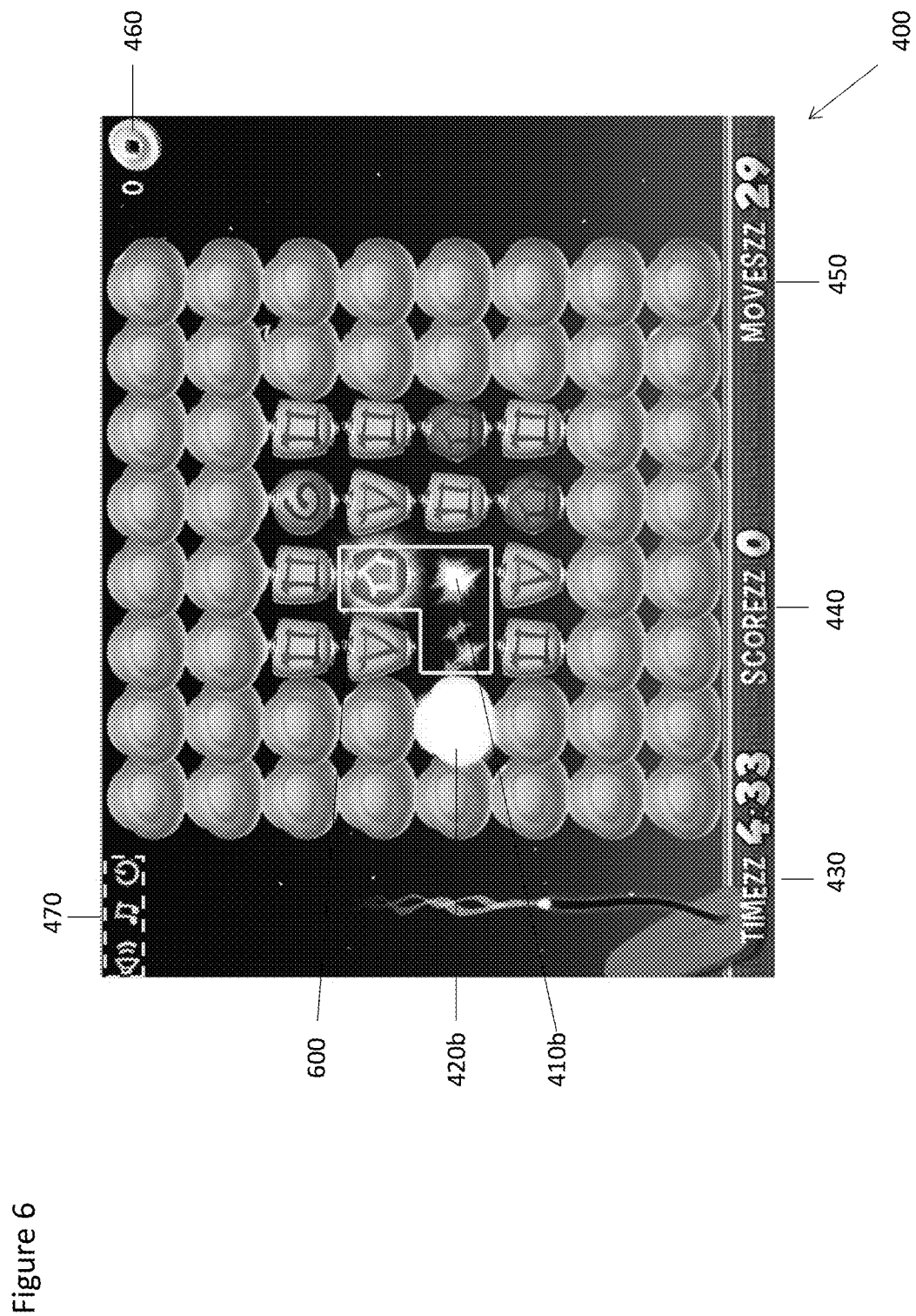

FIG. 6 shows the game board 400 of FIG. 5 immediately after the selection of the group of three neighbouring first game objects 410*b* having at least one same characteristic. The successful selection of matching neighbouring first game objects 410*b* results in the removal, in some embodiments of the selected first game objects 410*b*, and also causes a state change in a neighbouring second game object 420*a* to for example a different display state in accordance with a stored third characteristic. In an embodiment the third characteristic may mandate different display colours of the second game object for each of the first 420*a* and second state 420*b*. FIG. 6 shows the neighbouring second game object 420*b* transformed into its second state.

In some embodiments, the second game objects are first transformed from a first state to a second state when activated, and subsequently only removed to for example reveal a first game object 410*a* when both first and second state have been activated. Hence, a second game object with a two-step or three-step characteristic for elimination is provided, thereby bringing an extra challenge and elements of strategic gameplay into the consideration of the user.

Figure 7:
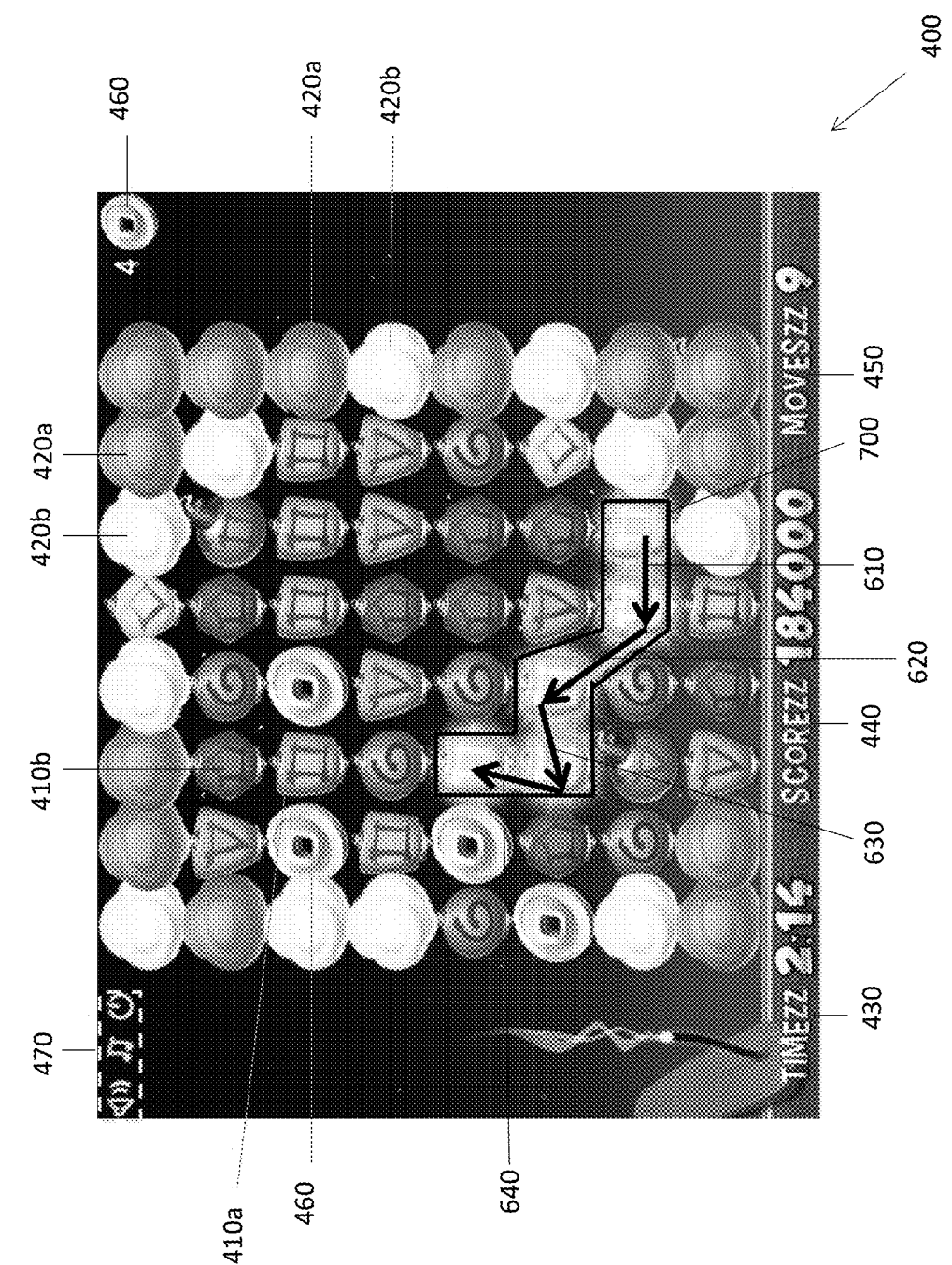

FIG. 7 illustrates a game board 400 in which a user input trajectory 700 spanning a selection sequence comprising five matching first game objects is shown. The sequence comprises portions of input as indicated by arrows 710, 720, 730 and 740 in this example. Other sequences and associated trajectories having different portions may also be detected in response to a selection of at least five or more neighbouring first game objects.

The selection of five or more neighbouring first game objects may generate a further game object with behavioural characteristics and a movement vector dependent at least in part on a proportion of the input trajectory. For example linking a certain number of game objects may cause an animated character to appear. The character may provide a further aspect to the game, such as a line-blaster whereby all game objects in a row and/or column shared with the last object in the link of matching game objects are removed from the game board.

From the foregoing it will therefore be understood that a user can interact with a game board of a game to achieve one or more game objectives. This may be by way of a touch input interacting with a touch screen of a user device. In order for the user device and/or game to determine where a user has touched the touch screen, and consequently for a determination to be made as to which game object a user has selected or is trying to select, a touch detection or collision detection algorithm is provided.

Figure 8:
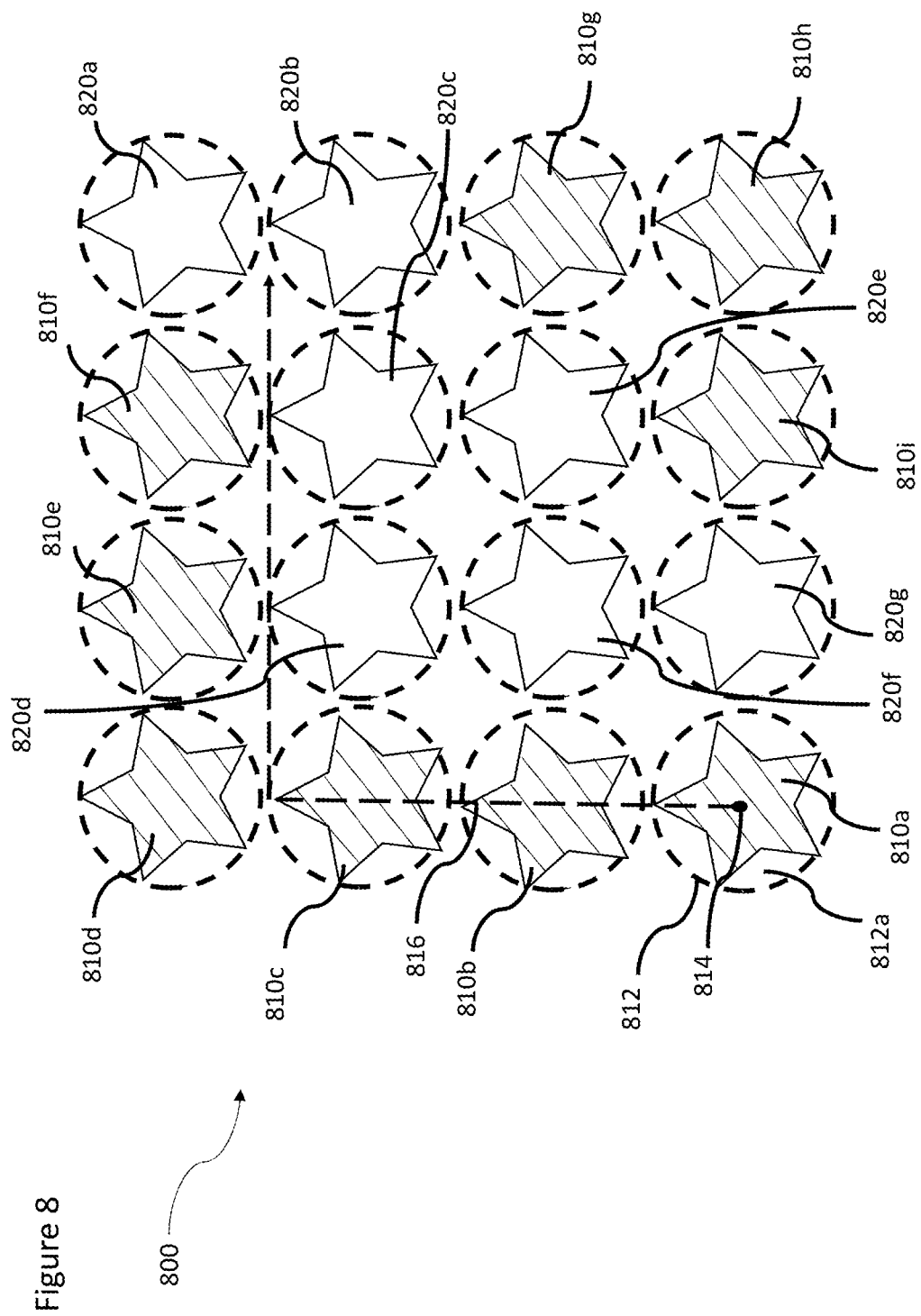
FIGS. 8 to 16 schematically show an example game board or portion of an example game board according to embodiments.

FIG. 8 shows a portion of a game board 800 as an example. The game board comprises first game object 820a to 810g, and second game objects 810a to 810i. In this example the first game objects are stars displayed without hatching, and the second game objects are stars with hatching. It will of course be understood that this is aby way of example only, and that the first and second objects could differ in any way e.g. colour, shape, and/or different types of objects. There may also be third, fourth and indeed any number of different types of object on the game board 800.

Each game object is contained within a selection (or collision) area. In the example of FIG. 8 the selection areas comprise circles, for example circle 812 which bounds object 810a. It will be understood that the use of circles is by way of example only, and that in other embodiments the selection areas may comprise squares, rectangles, or indeed any other shaped polygon. The size of one or more of the collision areas may also be configurable. This may be configured for example by a game designer If a user touches a point on the game board within a given selection area, then it is considered that a user has selected a game object that is contained within or associated with that selection area. This is the case even if the user has selected a point that it outside the object itself, but within the selection area. For example, if a user selects a point 812a within circle 812, then it will be determined that the user has selected game object 810a, even though the contact point is outside of that object.

A user can select a series of objects in-turn in order to attempt to meet a game objective. For example a user may attempt to link a series of objects of the same type and/or sharing one or more characteristics. An example user input path is shown by the dashed line 816 in FIG. 8. Initially a user touches object 810a at point 814, and then the user's contact with the game board 800 follows a path as shown by dashed line 816. The user initially selects first game objects 810a, 810b and 810c. This may be determined in a straightforward manner since the path of user contact is clearly within respective selection areas 812 of those objects. After the user has selected object 810c the contact path turns right (when viewing FIG. 8). From this point on it may be difficult to determine which object(s) the user is trying to select, because the contact path 816 passes between available objects. For example the path 816 passes directly between object 810e and object 820d, and directly between object 810f and object 820c. Accordingly the game may make an incorrect decision as to which object the user is trying to select, or may make no decision at all.

It will be understood that the dashed lines (e.g. circles) in FIG. 8 are for the purposes of explanation only, and that in practice the boundaries defining the selection areas are not visible to a user. For the purposes of explanation it may therefore be considered that the user interface comprises a "visible layer" which comprises the visible elements of the game with which the user interacts, and a "detection layer" which notionally overlays the visible layer (or is notionally overlaid by the visible layer), and which detection layer is divided in to a plurality of selections areas for determining locations of user input on the visible layer. Together, the plurality of selection detection areas may be considered to comprise a selection detection area array. In some embodiments the selection detection areas are comprised in a pixel array. That is the selection detection area array may be comprised in a pixel array.

When a user touches the display a determination can be made as to which pixel(s) the user is contacting. A pixel or set of pixels can be associated with a respective selection detection area. Therefore from the determination of which pixel(s) the user is contacting a determination can be made as to the selection detection area (and consequently object) that the user is selecting or attempting to select. It will be understood that there may not always be a one-to-one relationship between a determined contact point and a pixel. For example, it may not always be possible to define a single pixel as a contact point. This could depend upon a resolution of the display of the device and/or a size of the user's input means (e.g. finger or stylus). Therefore in some embodiments it may be necessary to define a position or location of a contact point on the user interface in terms of a plurality of pixels. This may be necessary in high definition (HD) devices. Whether it is a single pixel or multiple pixels, in some embodiments the location of that pixel or those pixels on the user interface can be defined in terms of x-y coordinates.

Figure 9:
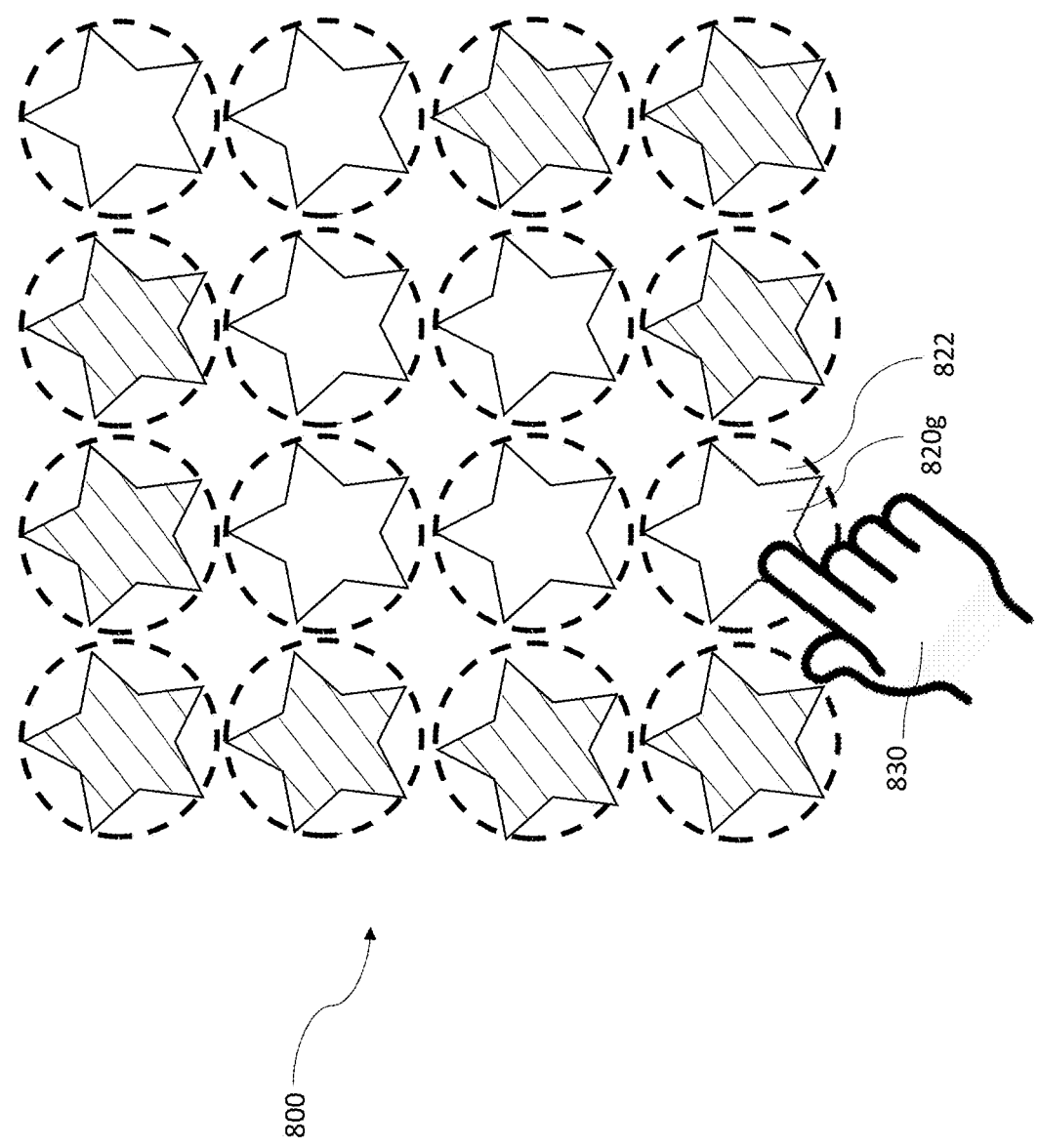

FIG. 9 shows an embodiment where a user 830 is contacting object 820g within selection detection area 822 of a game board 800. Accordingly it can be determined that object 820g has been selected by the user 830. As mentioned previously the size of the initial selection area is configurable. Therefore in this embodiment the initial selection radius is configurable. It will now be explained how an algorithm is used to predict a subsequent object that a user is attempting to select, and how selection of that object is facilitated. Subsequent to the user 830 selecting selection detection area 822, a determination is made as to which other game objects on the game board are selectable so as to form a link from the game object 820g.

Figure 10:
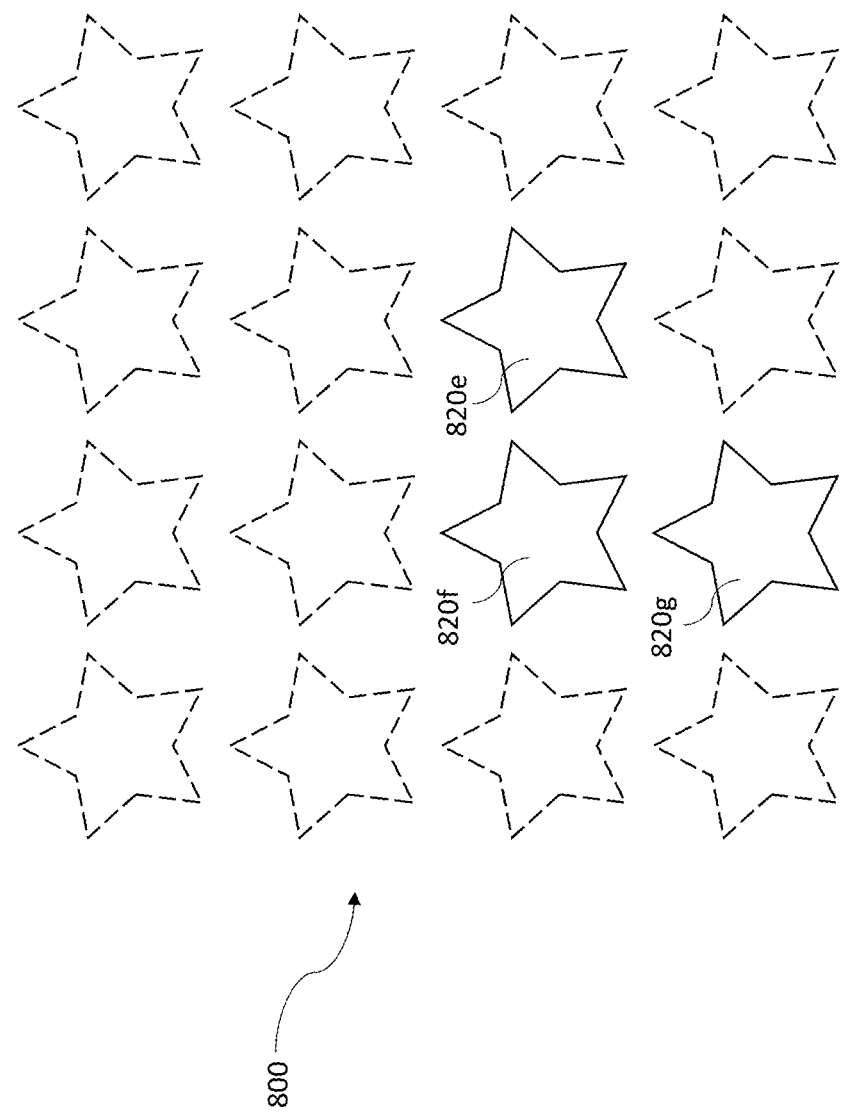

This is shown by way of example in FIG. 10. As previously mentioned, object 820g is an object of a first type i.e. may be considered a first game object. In order to link from first game object 820g, then the user will need to move their finger on the display so as to select another first game object i.e. an object sharing one or more characteristics with object 820g. In this example where object 820g has been selected first, there are only two other candidate first objects which the user can select so as to link from the object 820g. In this case the candidate objects which can be linked to are objects 820e and 820f. Accordingly all objects which cannot be directly linked to object 820g are omitted from consideration as candidate link objects at this point. The objects (in this case stars) which cannot be directly linked to from object 820g are represented in FIG. 10 by dashed lines. It is shown that second game objects 810a to 810i are omitted (since game objects of different types cannot be linked). Also first game objects which are remote from game object 820g are omitted from consideration at this point since objects can only be directly linked to each other if they are adjacent to each other on the game board.

Figure 11:
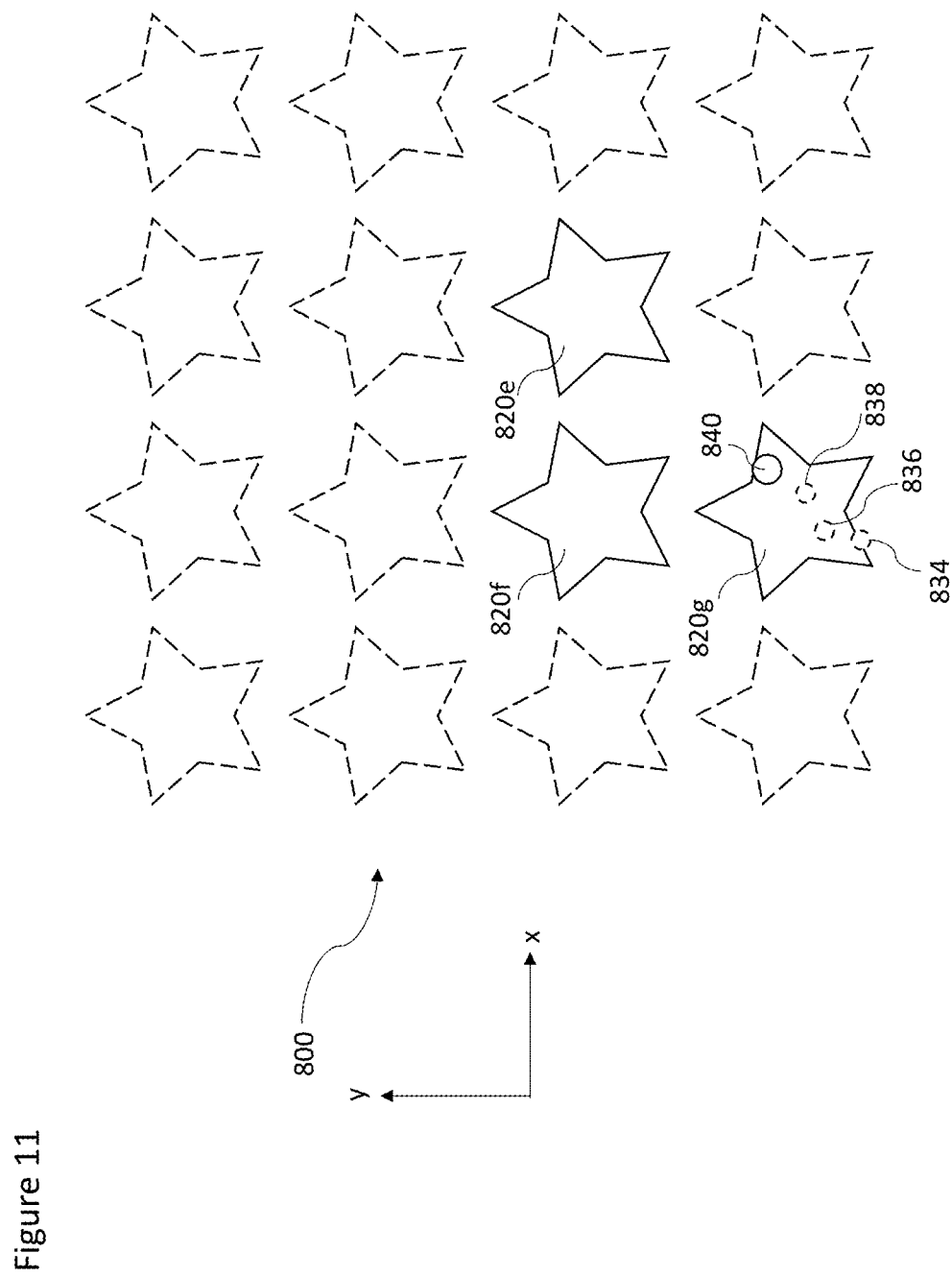

According to some embodiments, positions of the user's finger are sampled as the user's finger moves over the display. According to some embodiments this sampling occurs multiple times per second. For example the user's contact with the display may be sampled four times per second. This is by way of example only and the sampling frequency may be configurable. In some embodiments the contact position is defined in terms of x-y coordinates on the display. Referring to FIG. 11, a user's last/most recently sampled or "current" touch point is shown at 840. Previously sampled touch points are shown at 834, 836 and 838. These sampled touch points define a path of the user's finger over the display. In this example the sampling has determined that the user's finger has moved from touch point 834 to touch point 836 to touch point 838 to touch point 840, in that order.

Figure 20B:
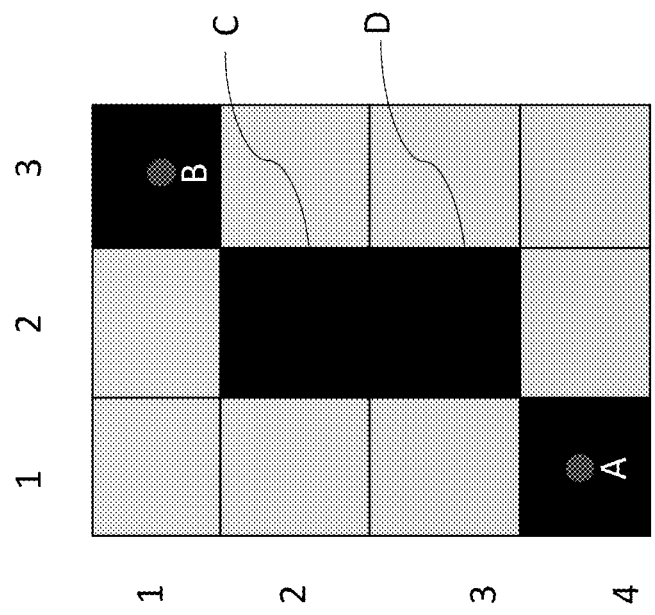
FIG. 20b schematically shows a schematic representation of the game board as a grid.
Figure 20A:
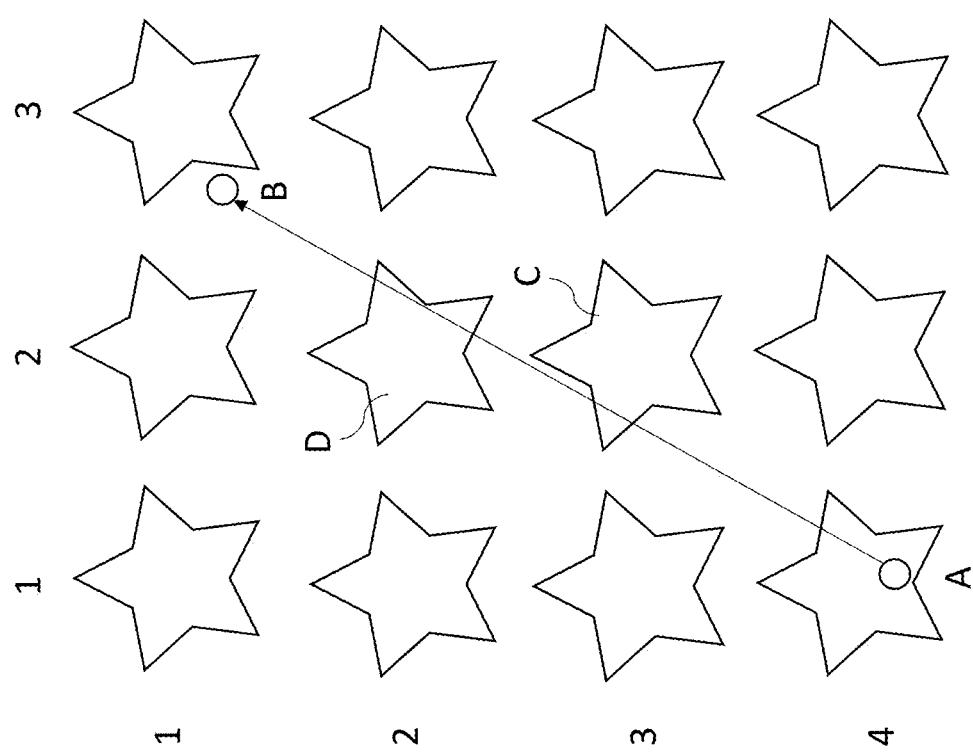
FIG. 20a shows a game board with selected game objects A and B.
Figure 21:
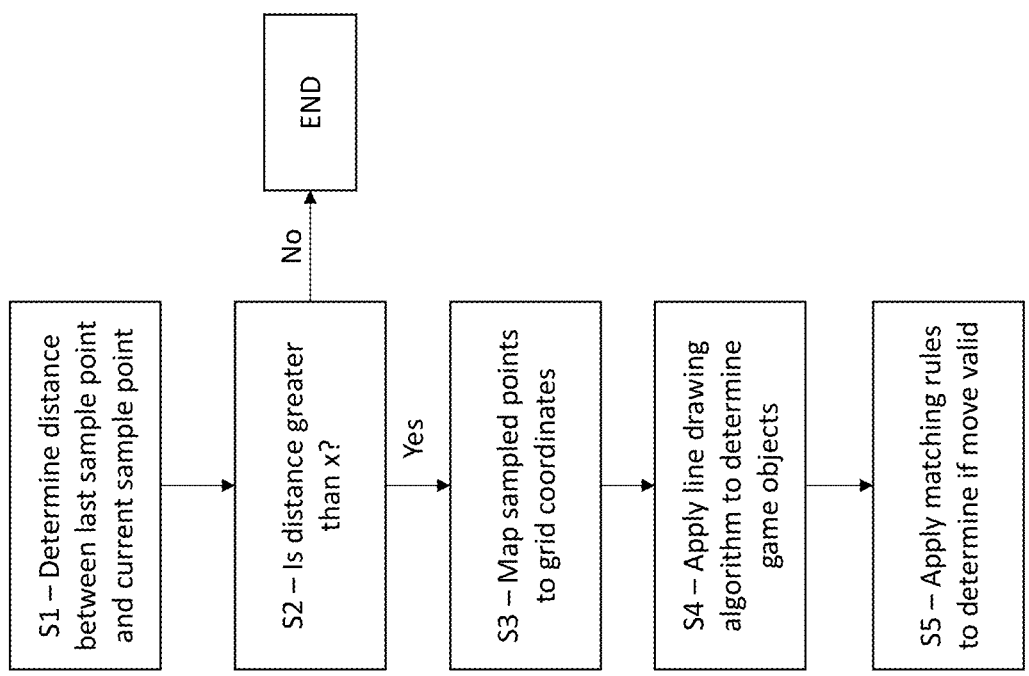
FIG. 21 shows a flow chart of a method of determining intervening game elements between two touch points.

Sampling of a user's contact or touch points is further discussed with respect to FIGS. 20a, 20b and 21. It will be understood that the sampling techniques discussed with respect to those Figures can be used in conjunction with the prediction algorithm herein discussed.

Figure 12:
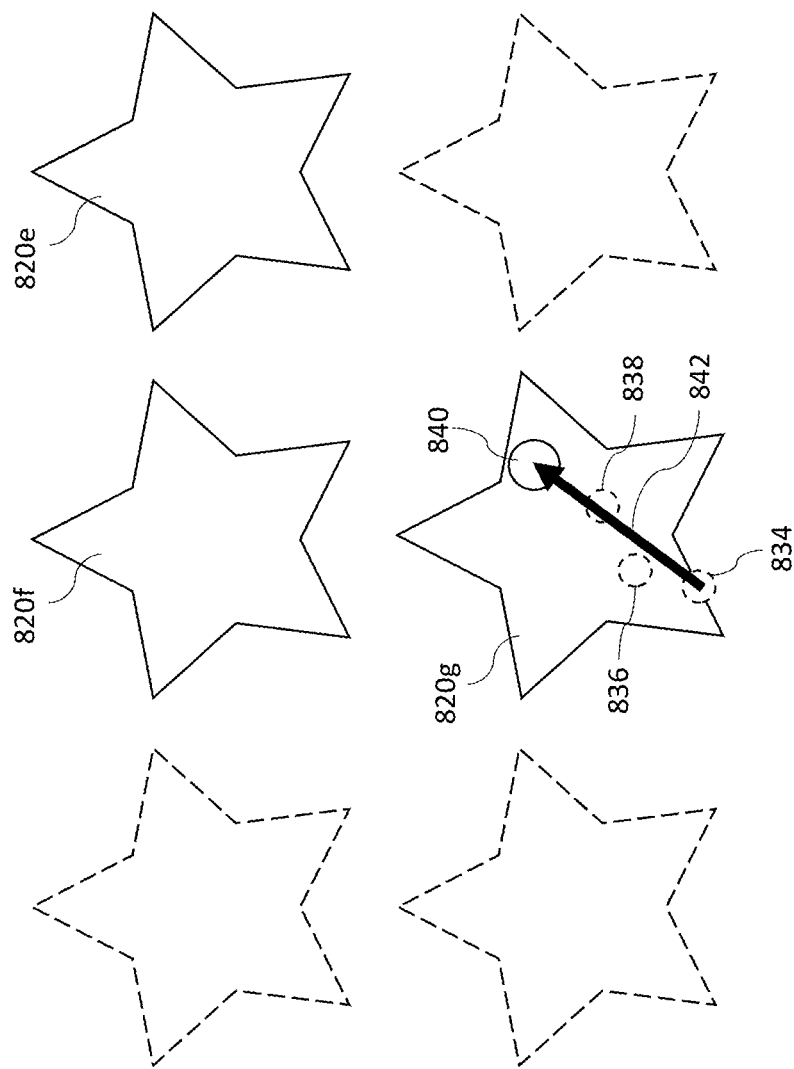

FIG. 12 shows an enlarged portion of the game board. From the sampled touch points 834, 836, 838 and 840 an average direction of the user's input is determined. This is representative of an average direction of movement of the user's finger on the display. In embodiments the average direction may be in the form of a vector. Alternatively it may simply comprise a direction component. In FIG. 12 the average direction vector is represented by arrow 842.

Figure 13:
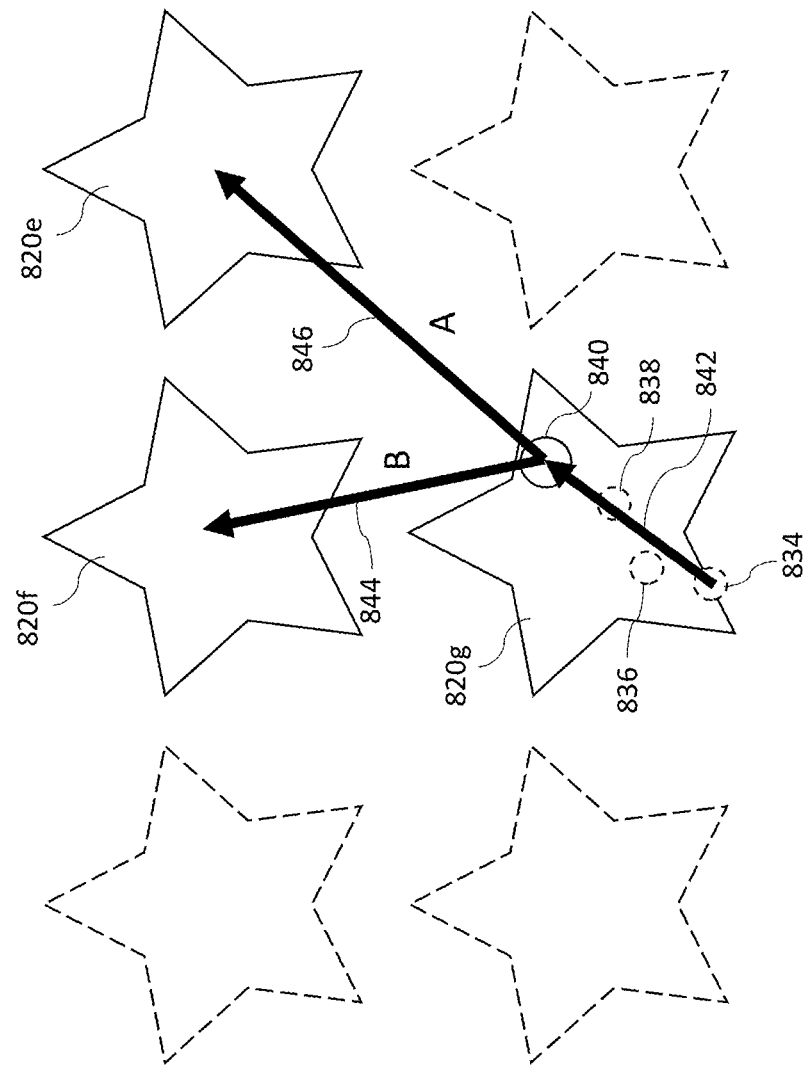

Once the average vector is calculated, then the direction of the vector is compared against candidate vectors for subsequent object selection. The candidate vectors are based on directions from the current position of the user's finger to possible or candidate selectable targets. This is shown for example in FIG. 13, which again shows an enlarged portion of a game board 800. A vector of the user's initial or previous finger movement is again shown by arrow 842. Then, from the current position 840 of the user's finger, a direction is determined for continued movement of the user's finger to each candidate object to which the user can link the first object 820g. In this example from object 820g the user can move their finger from current contact point 840 towards object 820f so as to link thereto, or can move their finger from contact point 840 towards object 820e, so as to link thereto. A direction from contact point 840 to object 820f is shown by direction B, represented by arrow 844. A direction from contact point 840 to object 820e is shown as direction A, represented by arrow 846. Again, both directions A and B may be in the form of a vector. Alternatively, they may simply comprise a direction component. According to some embodiments the candidate directions are based on a direction from the current (or initial) contact point to a centre of a candidate object. This is by way of example only, and the direction could be from the current contact point to an edge, corner, or indeed any other point on the candidate object. Once the candidate directions have been established, then they are compared with the initial or previous direction. For example, the direction of arrows 844 and 846 are compared with the direction of arrow 842. Then, the subsequent game object to be selected can be predicted based on which candidate direction differs or deviates the least from the initial direction. In this case, and with reference to FIG. 13, it can be seen that arrow 846 deviates less from the direction of arrow 838 than does arrow 844. Therefore it can be determined that the user's direction of movement is towards object 820e, and therefore this can be selected as the predicted subsequent object to be selected by the user.

Figure 14:
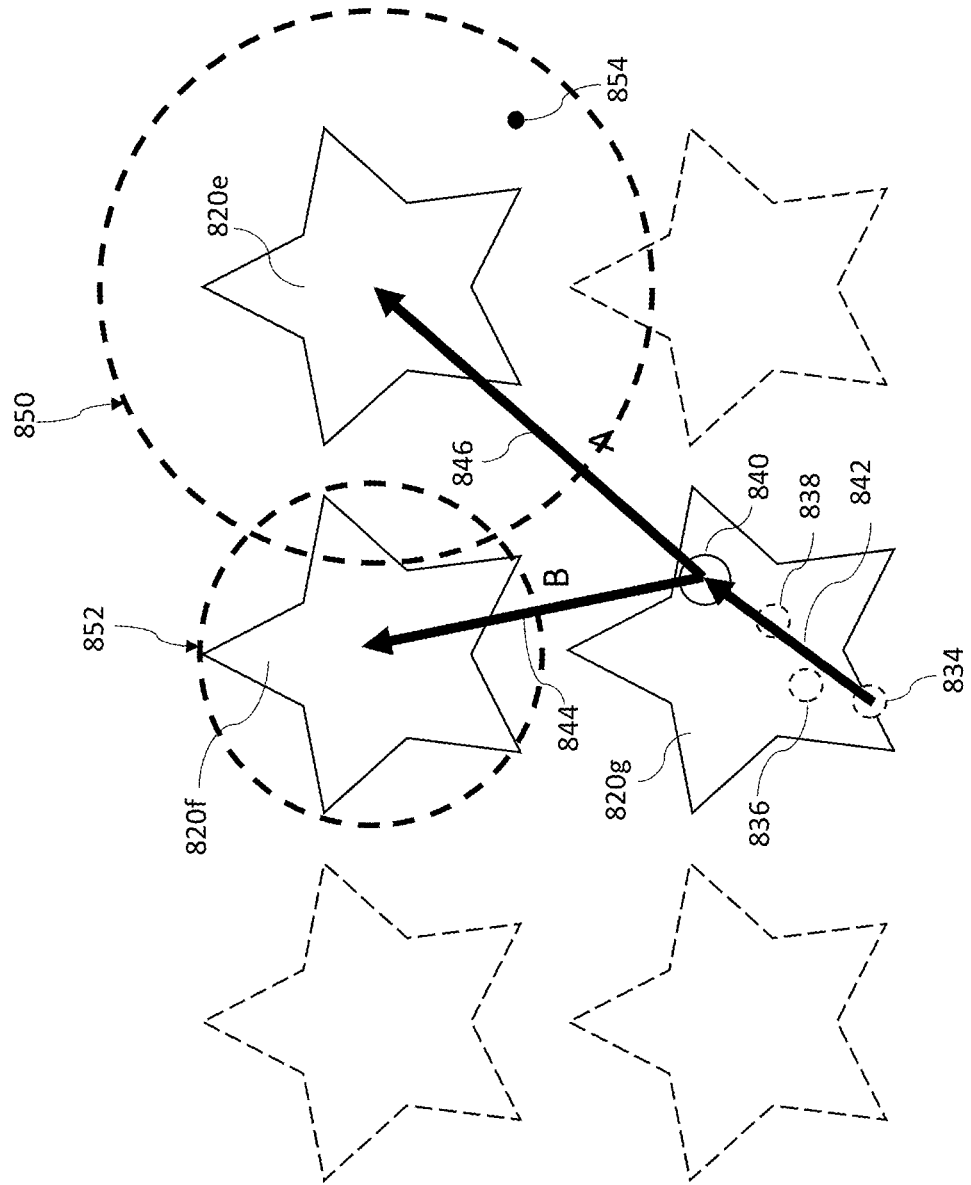

Once it has been predicted which is the next object to be selected, then a selection area associated with that object is enlarged. In some embodiments the prediction step may be considered as a step prior to the selection-area enlargement step. In other embodiments the prediction may be considered as comprised in the step of enlarging the selection area. That is the selection area for the predicted or subsequent object to be selected can be enlarged from a first size to a second size. In embodiments the selection area of the predicted object is enlarged to a size such that it is larger than other selection areas in the selection area array. This is shown for example in FIG. 14. In this Figure it can be seen that the selection area for object 820e has been enlarged, as represented by the dashed circle referenced 850. This selection area is enlarged compared to selection area for object 820f, which is shown by the dashed circle referenced 852. This makes selection of object 820e easier for the user. For example a further potential contact point is shown at 854. If a user's finger deviates from arrow A and ends up at contact point 854, then this will still result in the selection of object 820e because it is within the enlarged selection area 850 for that object. Had the selection area not been enlarged, then contact at point 854 would not result in selection of object 820e. This can help account for erratic movement of a user's finger on the game board, which may for example be a result of the user trying to play the game whilst on the move e.g. in a bus or train.

Whilst FIGS. 9 to 14 have shown there to be two candidates objects for subsequent selection (i.e. objects 820e and 820f), it will of course be understood that in embodiments there may be any number of candidates objects. Where there are more than two candidate objects then the predicted object can still be selected in the same way i.e. by choosing an object which requires the least deviation from an initial direction of user input.

Figure 15:
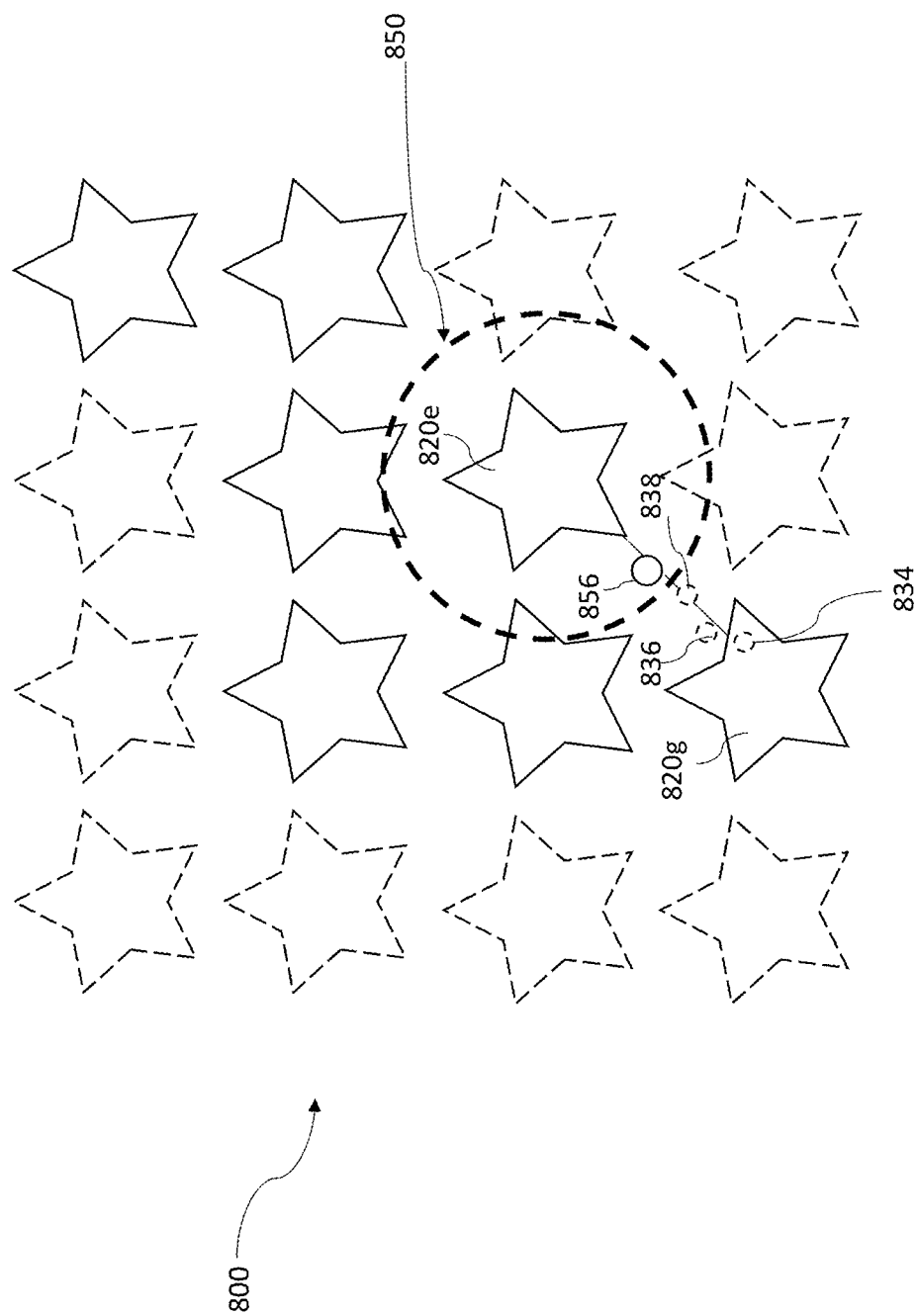

Therefore, after the selection area has been enlarged, an object can be selected in the previously described manner i.e. by contacting a point within the selection area. This is shown for example in FIG. 15 where a new contact point is shown at 856 within enlarged selection area 850. Contact at point 856 causes selection of object 820e.

Figure 16:
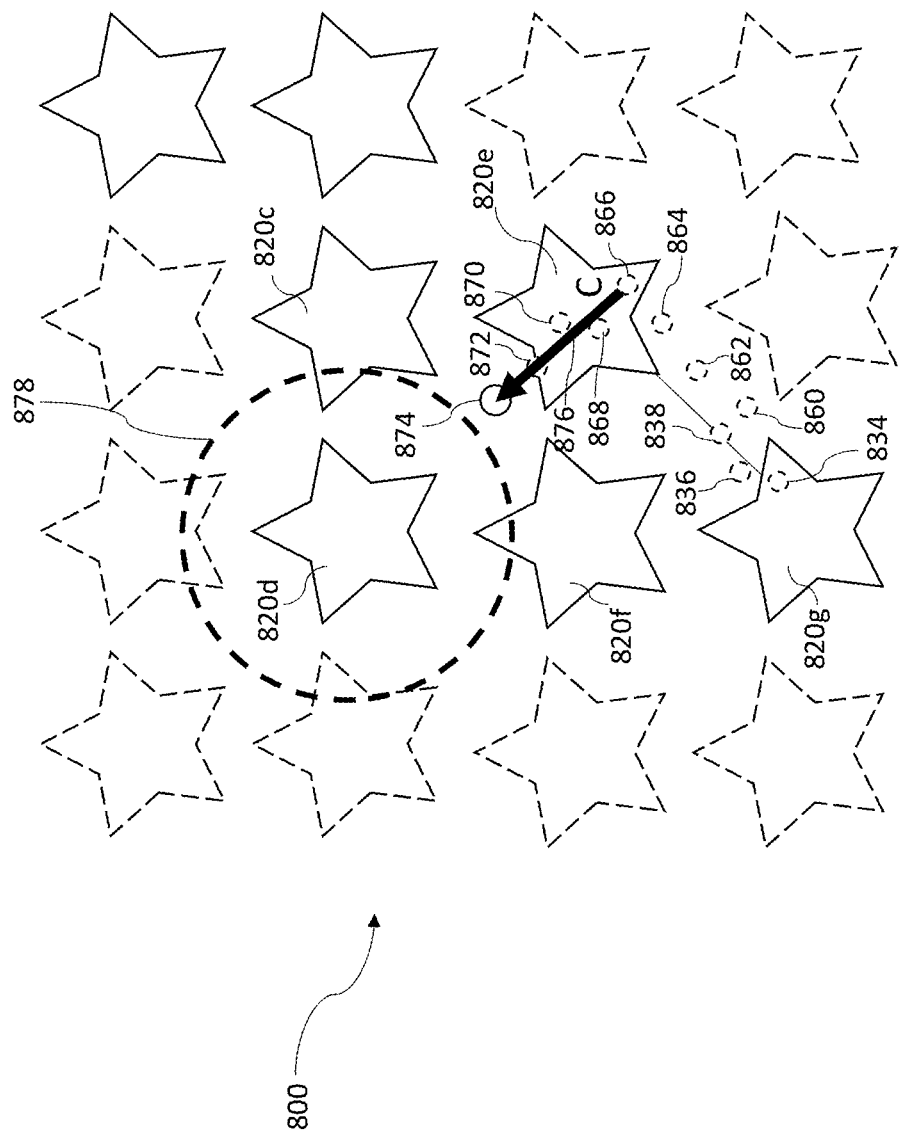

The algorithm can then continue to select further objects in the same manner. This is shown for example in FIG. 16 where a user's initial movement of their finger over the game board is represented by sampling points 834, 836, 838, 860, 862 and 864, which results in selection of object 820e. Following this, the continued input direction of movement is shown by sampling points 866, 868, 870, 872 and then "current" contact point 874. These sampling points are processed to provide an average direction in the direction of arrow C, as referenced 876. Using the determined direction C of arrow 876 it is predicted that the user is trying to select object 820d, and therefore a selection area for that object is enlarged, as shown by circle 878. Of course the process can also continue from that shown n FIG. 16 to one or more further selectable objects.

Some use cases will now be described with respect to FIGS. 17 to 18.

Figure 17A:
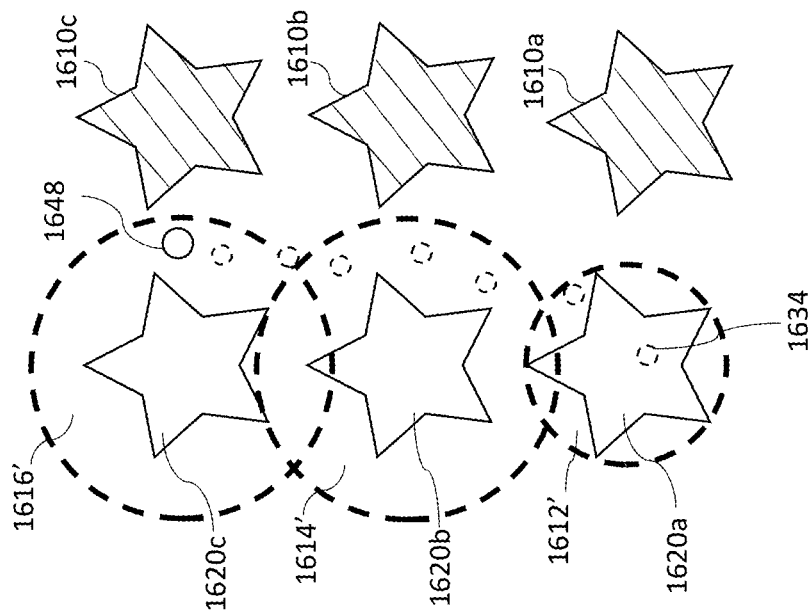
FIG. 17a shows an example of a portion of a game board when a prediction algorithm as described in the present application is not implemented.
Figure 17B:
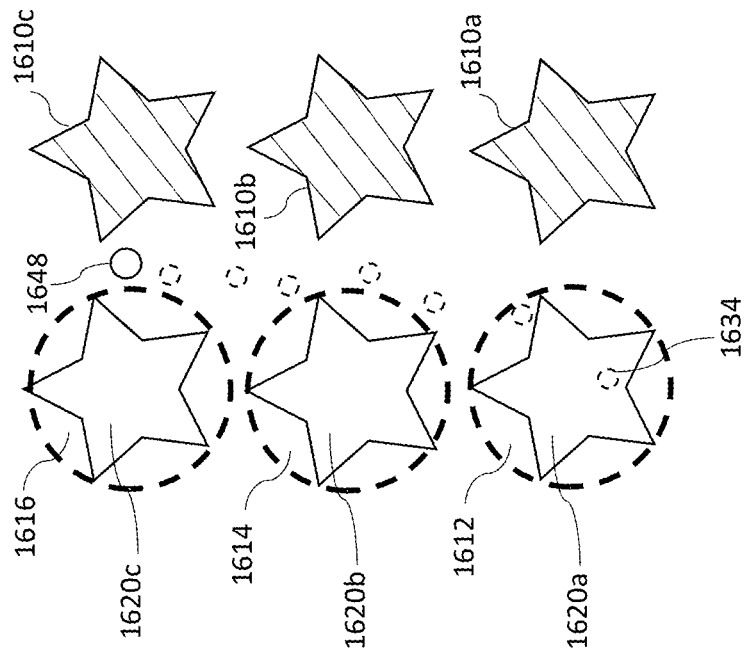
FIG. 17b shows the game board of FIG. 17a when the prediction algorithm is implemented.

In FIGS. 17a and 17b a portion of a game board is shown comprising the first game objects 1620a to 1620c, and second game objects 1610a to 1610c. Sampling points of the user's touch are illustrated by dashed circles at and between 1634 and 1648, with contact point 1648 comprising the user's "current" contact point. In the example of FIG. 17a the algorithm for enlarging selection areas is not implemented. Therefore as shown some of the sampled contact points are outside of the selection areas 1614 and 1616 associated with selectable objects 1620b and 1620c respectively. Therefore those contact points outside selection areas will not result in selection of a subsequent object.

FIG. 17b shows the same situation but where the prediction algorithm is implemented. As previously explained, the algorithm predicts a subsequent object that the user is trying to select, and accordingly increases a selection area for that object. Therefore as shown in FIG. 17b it has been predicted that the user, having already selected first object 1620a, then wants to select object 1620b, and after object 1620b wants to select object 1620c. Accordingly selection areas 1614' and 1616' are enlarged. In FIG. 16b these areas are shown as enlarged simultaneously. It will be understood that in at least some embodiments they will be enlarged sequentially i.e. selection area 1614' is enlarged first followed by selection area 1616'. Once selection area 1616' has been enlarged, then selection area 1614' can simultaneously be reduced back to its original size. The enlargement/reduction can be step-wise (which may be a single step), or continuous. Therefore from FIG. 16b it will be appreciated that the contact path remains within selection areas at all times, and therefore the sequence of selection of first objects 1620a, 1620b and 1620c can be determined. Therefore when a player selects a game object and then does not move in a straight line over the selectable game object, the prediction algorithm still allows the user to select the desired game objects.

FIG. 18a and FIG. 18b show an analogous situation to FIGS. 17a and 17b, except in FIGS. 18a and 18b all of the objects shown are of a first (same) type i.e. objects 1720a to 1720f. The contact path from initial contact point 1734 to "current" contact point 1748 is the same as in FIG. 17a and FIG. 17b. Again, in this example the user wants to select game objects 1720a, 1720b and 1720c (i.e. in a straight vertical line when viewing FIGS. 17a and 17b), but has not moved their finger in a straight line. Since the desired first objects are surrounded by other selectable or candidate first objects, it is possible that incorrect objects may be selected without the prediction algorithm. FIG. 18b shows how the expanded selection areas 1714' and 1716' ensure that the correct objects 1720b and 1720c are selected.

FIGS. 19a and 19b show a use case where a player wants to select a game object positioned diagonally from a currently selected game object. That is in this example the user wants to select game object 1820c after selection of game object 1820a. The contact path of the user's input is demonstrated by the dashed circles between initial contact point 1834 and "current" contact point 1848. Without the prediction algorithm (as shown in FIG. 19a) it is difficult to determine which subsequent game object the user wants to select since a gap between the selection areas is hard to consistently hit. With the algorithm enabled (as shown in FIG. 19b) the player's intention can be recognised by virtue of the prediction algorithm including the enlarged selection area 1814'.

Figure 22:
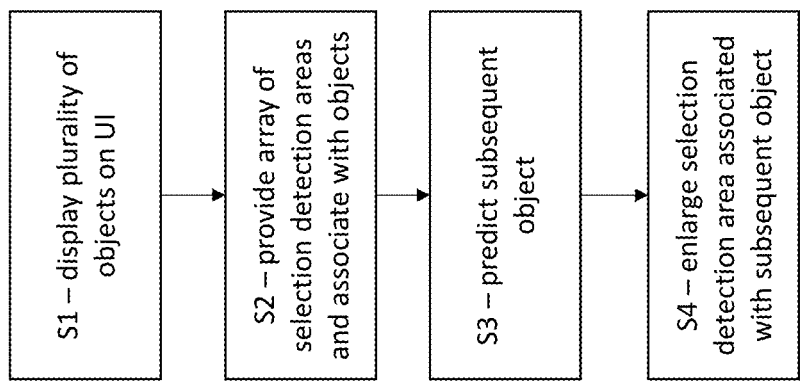
FIG. 22 shows a flow chart of a method of determining a subsequent game object to be selected.

A flow chart of a method according to an embodiment is shown with respect to FIG. 22.

At step S1 a plurality of objects are displayed at positions of a user interface of a device. Each game object has one or more characteristics.

At step S2 an array of selection detection areas is provided. Each of the selection detection areas is associated with a respective object so as to enable detection of selection of one or more of the objects.

At step S3, and following selection of one of the plurality of objects by the user, a subsequent game object to be selected by the user is predicted in dependence on one or more selection criteria.

At step S4 a selection detection area associated with the subsequent object is enlarged.

It will be appreciated that embodiments of the prediction algorithm can also be used in conjunction with "backlining", where a user deselects an object by reversing their input. That is the "subsequent" object to be selected could also be one that a user has reversed to from a previous object which the user no longer wants to select.

According to at least some embodiments a user's input is determined to be confirmed when the user releases contact from the game board, for example by lifting their finger from the touch screen.

Reference is made to FIGS. 20a, 20b and 21. These Figures illustrate a method which addresses missed touch points. This may be used, for example, in grid based linking games or any other suitable game. This may be used in conjunction with or independently of any of the previously described embodiments.

Reference is made to FIG. 20a which schematically shows a game board with game elements. In the example shown, a touch point referenced A is detected with respect to the displayed game board and the next touch point which is detected is referenced B. As can be shown from FIG. 20a, touch points A and B are associated with respective game objects which are separated by, for example, two further game objects C and D in this example. Thus, game objects between touch point A and touch point B have potentially been missed. This may be due to the player moving his finger very quickly and/or due to a low sampling rate. For example, there may be a temporary slowdown of the application or the application may just be relatively slow. This might be caused by the operating system and/or a low frame rate on the device and/or network conditions and/or limited available processing resources on the device. Thus, in the scenario illustrated in FIG. 20a, the processor will not have any information about the game objects that the player would have touched on the way between the two detected points A and B.

This may be frustrating as the link between the game objects associated with points A and B is not formed correctly and the player has to start again and/or to try to move his finger more slowly. Some embodiments may address or at least partially mitigate this.

With reference to the method flow of FIG. 21, in step S1, the distance between the last sampled point A and the current sampled point B is determined. In some embodiments, the X, Y coordinates of the touch is screen are used to determine a measure of this distance. Other techniques may be used to determine distance or a measure of distance.

In step S2, it is determined whether the distance between the last sampled point A and the current sampled point B is greater than x. If not, the method ends. The distance x may be configurable. In some embodiments the distance x is set as a distance between a centre of a first object on the game board and a centre of an adjacent object on the game board. Therefore the distance between A and B will be greater than x if A and B are associated with non-adjacent game elements. Therefore it may be considered that a check is made as to whether the sampled points (e.g. points A and B) are associated with adjacent game elements before proceeding with the method of applying the line drawing algorithm to determine if there are any missed touch points.

If it is determined that the distance between the last sampled point A and the current sampled point B is greater than x, then the next step is step S3. In this step, the sampled points with respect to the game board are mapped to grid coordinates. This is schematically shown in FIG. 20b. In particular the elements on the game board are assigned coordinates in a 2-D space for each game object. In the example shown, the coordinates are 1 to 3 in the x-direction and 1 to 4 in the y direction for a 3×4 game object grid. The start and end points A and B are then converted to coordinates on this grid. Thus, the last sampled point A has coordinates (1, 4) and the current sampled point B has called coordinates (3, 1).

In step S4, a line drawing algorithm can be applied between the start and end points A and B in grid coordinates to determine which game objects would have been touched. It should be appreciated that any suitable algorithm can be used and by way of example a Bresenham line drawing algorithm may be used.

FIG. 20 be shows that objects D and C would be determined to have been touched (game object D having coordinates (2,3) and game object C having coordinate (2, 2)).

After the game objects that would have been touched are identified, the next step is step S5 where the game rules are applied to see if a valid link would have been formed. Accordingly, if a link of game objects associated with points A, D, C and B would have resulted in a match, then it is determined that the link is valid. If, on the other hand, it is determined that game objects associated with points A, D, C and B would not have resulted in a match, then it is determined that the link is not valid and the move would not be permitted.

In some embodiments, steps S1 and S2 may be omitted. Instead, the sampled points are mapped to the grid coordinates. Based on this mapping, it can be determined if the last sampled point A and current sampled point are associated with adjacent game elements. If not then the method will continue to step S4.

In some embodiments, the method may comprise determining if the sample rate is below a threshold and if so triggering the method.

In some embodiments, if it is determined in step S5 that there is not a valid move, the method may comprise waiting to see if any further game element is selected by the user before determining that the move is invalid. The selection of the further game element may make the move valid. This may be the case, for example, where game elements are associated with letters.

Some embodiments have been described in relation to a method where the game elements are mapped onto a grid having X, Y coordinates. It should be appreciated that other methods for determining the position of intervening game elements may be used in alternative embodiments.

In some embodiments, steps S1 and S2 may be simplified to determine if the current sample point and the last sampled point represent adjacent game elements and if not, the method proceeds to step S3.

Although embodiments have been described in terms of a "linker" game as shown for example in FIGS. 4 to 20, the concept is equally applicable to other applications such as other games where a user selects one or more objects. For example the concept could be applied to a match-three game such as Candy Crush, or a "slider" or "switcher" game in which a user can switch columns and/or rows on a game board. Also, and as previously discussed, the invention is not limited to gaming.

Where reference is made to a determination being carried out, the determination may be carried out in a device on which the game is being played, for example by using at least one processor and at least one memory on the device. Alternatively the determination may be carried out in a game server in communication with the device, for example using at least one processor and at least one memory in the game server. Alternatively the determination may be carried out by the device and game server working in conjunction.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes embodiments of the invention, there are several variations and modifications which may be made to the disclosed solution without departing from the scope of the present invention.

The invention claimed is:

1. A method of controlling a user interface of a device responsive to user input by a user comprising:
displaying on the user interface of the device an array of a plurality of objects displayed in an arrangement on the user interface, each object having one or more characteristics, at least one of said objects being surrounded by a plurality of other objects of said plurality of objects;
providing an array of selection detection areas, and associating each of the selection detection areas with a respective object on the user interface so as to enable detection of selection of one or more of the objects by the user in response to detecting user input in a respective selection detection area;
detecting a selection of one of the plurality of objects by detecting user input in a selection detection area of the one of the plurality of objects;
determining a direction of user input;
predicting, using a prediction algorithm, a subsequent object to be selected by the user by selecting a candidate object as the subsequent object from a plurality of candidate objects relating to the determined direction of user input, the selected candidate object being determined in dependence on a least deviation from the determined direction of user input, the selected one of the plurality of objects and the subsequent object providing a sequence of selected objects displayed on the user interface; and
modifying the selection detection area of the subsequent object predicted to be selected by the user, the modifying comprising enlarging the selection detection area of the subsequent object from a first size to a second size that is larger than the first size.

2. A method as set forth in claim 1, wherein the determining a direction of user input comprises determining an average direction of the user input.

3. A method as set forth in claim 1, wherein the determining a direction of user input comprises sampling a plurality of points of contact of the user input on the user interface.

4. A method as set forth in claim 1, wherein the method comprises only enlarging one selection detection area of the array of selection detection areas at any one time.

5. A method as set forth in claim 1, wherein the method comprises only enlarging a selection detection area if it is associated with an object which shares at least one characteristic with the one of the plurality of objects, in accordance with the selection criteria.

6. A method as set forth in claim 1, wherein the array of selection detection areas is invisible to the user.

7. A method as set forth in claim 1, wherein the user input comprises sliding of a user's finger or stylus over the arrangement on the user interface.

8. A method as set forth in claim 1, wherein the plurality of objects comprise a plurality of game objects on a game board.

9. A method as set forth in claim 1, wherein the predicting by said prediction algorithm uses a selection criteria which comprises game rules associated with a game.

10. A non-transitory computer readable medium comprising computer executable instructions, which when run by at least one processor are configured to control a user interface of a device responsive to user input by a user by:
    displaying on the user interface of the device an array of a plurality of objects displayed in an arrangement on the user interface, each object having one or more characteristics, at least one of said objects being surrounded by a plurality of other objects of said plurality of objects;
    providing an array of selection detection areas, and associating each of the selection detection areas with a respective object on the user interface so as to enable detection of selection of one or more of the objects by the user in response to detecting user input in a respective selection detection area;
    detecting a selection of one of the plurality of objects by detecting user input in a selection detection area of the one of the plurality of objects;
    determining a direction of user input;
    predicting, using a prediction algorithm, a subsequent object to be selected by the user by selecting a candidate object as the subsequent object from a plurality of candidate objects relating to the determined direction of user input, the selected candidate object being determined in dependence on a least deviation from the determined direction of user input, the selected one of the plurality of objects and the subsequent object providing a sequence of selected objects displayed on the user interface; and
    modifying the selection detection area of the subsequent object predicted to be selected by the user, the modifying comprising enlarging the selection detection area of the subsequent object from a first size to a second size that is larger than the first size.

11. An apparatus comprising:
    at least one memory and at least one processor, the at least one memory and the at least one processor configured to cause the apparatus to:
    display on a user interface of the apparatus an array of a plurality of objects displayed in an arrangement on the user interface, each object having one or more characteristics, at least one of said objects being surrounded by a plurality of other objects of said plurality of objects;
    provide an array of selection detection areas, and associate each of the selection detection areas with a respective object on the user interface so as to enable detection of selection of one or more of the objects by the user in response to detecting user input in a respective selection detection area;
    detect a selection of one of the plurality of objects by detecting user input in a selection detection area of the one of the plurality of objects;
    determining a direction of user input;
    predict, using a prediction algorithm, a subsequent object to be selected by the user by selecting a candidate object as the subsequent object from a plurality of candidate objects relating to the determined direction of user input, the selected candidate object being determined in dependent on a least deviation from the determined direction of user input, the selected one of the plurality of objects and the subsequent object providing a sequence of selected objects displayed on the user interface; and
    modify the selection detection area of the subsequent object predicted to be selected by the user, the modifying comprising enlarging the selection detection area of the subsequent object from a first size to a second size that is larger than the first size.

12. An apparatus as set forth in claim 11, configured to determine an average direction of the user input when determining a direction of user input.

13. An apparatus as set forth in claim 11, configured to sample a plurality of points of contact of the user input on the user interface when determining a direction of user input.

14. An apparatus as set forth in claim 11, wherein the apparatus is configured to only enlarge one selection detection area of the array of selection detection areas at any one time.

15. An apparatus as set forth in claim 11, wherein the apparatus is configured to only enlarge a selection detection area if it is associated with an object which shares at least one characteristic with the one of the plurality of objects, in accordance with the selection criteria.

16. An apparatus as set forth in claim 11, wherein the array of selection detection areas is invisible to the user.

17. An apparatus as set forth in claim 11, wherein the user input comprises sliding of a user's finger or stylus over the arrangement on the user interface.

18. An apparatus as set forth in claim 11, wherein the plurality of objects comprise a plurality of game objects on a game board.

19. An apparatus as set forth in claim 11, wherein the predicting by said prediction algorithm uses a selection criteria which comprises game rules associated with a game.

20. The method as claimed in claim 1, comprising repeating said predicting and modifying steps for at least one further subsequent object to add said at least one further object to said sequence of selected objects.

21. The non-transitory computer readable medium as claimed in claim 10, wherein said computer executable instructions, which when run by at least one processor are configured to repeat said predicting and modifying steps for at least one further subsequent object to add said at least one further object to said sequence of selected objects.

22. The apparatus claimed in claim 11, wherein the at least one processor configured to cause the apparatus to repeat said predicting and modifying steps for at least one further subsequent object to add said at least one further object to said sequence of selected objects.

* * * * *